(12) United States Patent
Furuta et al.

(10) Patent No.: US 7,889,259 B2
(45) Date of Patent: Feb. 15, 2011

(54) BRANCHED OUTLET TYPE IMAGE PICKUP APPARATUS FREE FROM CHARGE TRANSFER ERROR CAUSED BY TEMPERATURE CHANGE AND A METHOD THEREFOR

(75) Inventors: Yoshinori Furuta, Asaka (JP); Hirokazu Kobayashi, Asaka (JP); Hiroyuki Oshima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 837 days.

(21) Appl. No.: 11/896,444

(22) Filed: Aug. 31, 2007

(65) Prior Publication Data

US 2008/0055444 A1    Mar. 6, 2008

(30) Foreign Application Priority Data

Sep. 4, 2006   (JP)   ............... 2006-238670

(51) Int. Cl.
H04N 3/14 (2006.01)
H04N 5/335 (2006.01)
H04N 5/225 (2006.01)
H04N 9/04 (2006.01)

(52) U.S. Cl. .................. 348/311; 348/207.99; 348/322; 348/323

(58) Field of Classification Search .................. 348/245, 348/311, 324
See application file for complete search history.

(56) References Cited

U.S. PATENT DOCUMENTS

| | | | | |
|---|---|---|---|---|
| 4,799,109 A | * | 1/1989 | Esser et al. ................. | 348/324 |
| 5,309,240 A | * | 5/1994 | Miwada ....................... | 348/311 |
| 5,379,125 A | * | 1/1995 | Iizuka ......................... | 358/443 |
| 5,652,664 A | * | 7/1997 | Kusaka et al. ............... | 358/483 |
| 6,593,968 B1 | * | 7/2003 | Ichikawa ..................... | 348/324 |
| 6,917,026 B2 | * | 7/2005 | Yasuda et al. ............. | 250/208.1 |
| 7,050,098 B2 | * | 5/2006 | Shirakawa et al. .......... | 348/245 |
| 7,760,261 B2 | * | 7/2010 | Kobayashi .................. | 348/311 |
| 2007/0115380 A1 | * | 5/2007 | Shibata et al. .............. | 348/311 |

FOREIGN PATENT DOCUMENTS

JP   5-244340 A   9/1993

* cited by examiner

*Primary Examiner*—Lin Ye
*Assistant Examiner*—Chia-Wei A Chen
(74) *Attorney, Agent, or Firm*—Birch, Stewart, Kolasch & Birch, LLP

(57) ABSTRACT

An image pickup apparatus has an image pickup device including an imaging section, in which signal charges read out from plural photosensitive cells are vertically transferred over vertical transfer paths and the transferred signal charges are in turn horizontally transferred over a horizontal transfer path, which has a branching section for assigning the transferred signal charges to plural output channels, i.e. plural horizontal transfer paths provided at the end of the horizontal transfer path. A temperature sensor for detecting the temperature of the image pickup device is provided on the imaging section, and a temperature-induced drift compensator corrects a transfer error of signal charges in the image pickup device. The compensator modifies transfer error correction based on the detected temperature. The image pickup apparatus can thus substantially reduce an assignment error even when the temperature of the image pickup device changes.

8 Claims, 22 Drawing Sheets

BRANCHED OUTLET TYPE IMAGE PICKUP APPARATUS FREE FROM CHARGE TRANSFER ERROR CAUSED BY TEMPERATURE CHANGE AND A METHOD THEREFOR

BACKGROUND OF THE INVENTION

1. Field of the Invention

The present invention relates to an image pickup apparatus, and in particular to an image pickup apparatus having a CCD (Charge-Coupled Device) type of image pickup device converting incident light to a corresponding image signal for correcting a transfer error. The present invention also relates to a method therefor.

2. Description of the Background Art

Conventionally, a multitude of various reading methods for reading out data at a high rate in a CCD-type image pickup device have been proposed. In particular, Japanese patent laid-open publication No. 244340/1993 proposes a branched-outlet type of CCD image pickup device comprising: a plurality of photosensitive cells for converting incident light to electrical charges; a first charge transfer path for transferring in one direction the electric charges read out from the photosensitive cells; a shift gate for transferring the electrical charges generated in the photosensitive cells to the first charge transfer path; a second charge transfer path connected via an output gate to the first charge transfer path; a first output portion connected to the output end of the second charge transfer path; a third charge transfer path connected to the output gate for transferring the electric charges in a direction different from the direction of the electric charges transferred over the second charge transfer path; and a second output portion connected to the output end of the third charge transfer path, the output gate being turned on during high speed driving to alternately output a signal from the first and second output portions, or the output gate being turned on during low speed driving to output a signal only from the first output portion.

This conventional configuration is based on the concept that since in a CCD-type image pickup device having only one output portion, it is difficult to drive the final stage amplifier producing an output and a CDS (Correlated Double Sampling) circuit subsequent to the amplifier at high frequency, two or more final stage amplifiers and CDS circuits are provided in the CCD-type image pickup device having a plurality of output portions in order to reduce the driving frequency by one half.

In addition to the CCD-type image pickup device disclosed in the above JP patent publication, a right-and-left separation type of CCD image pickup device has been proposed. The term "right-and-left separation type of CCD image pickup device" means that signal charges generated in the right and left halves of the photosensitive cell array of an image pickup device are transferred over different horizontal transfer paths in right and left directions and read out therefrom, respectively. However, since the signal charges of the right and left halves of the photosensitive cell array of the image pickup device are separately read out, a difference in property between the amplifiers provided at the output ends of the right and left horizontal transfer paths and a difference in property between the right and left horizontal transfer paths cause a vertical split to be viewed in the center of a frame of image.

The branched-outlet type of CCD image pickup device disclosed in the above JP patent publication operates so that horizontally transferred signal charges are alternately assigned to the two horizontal transfer paths and amplifiers during transfer of signal charges. Therefore, the image pickup device may be designed such that the electric charges representative of specific colors are assigned to the corresponding horizontal transfer paths and amplifiers, thus allowing a white balance adjustment to be performed to compensate for the difference in property between the horizontal transfer paths and amplifiers.

However, when signal charges developed from a single horizontal transfer path are in turn assigned to two horizontal transfer paths, an assignment error occurs, thereby causing a phenomenon such as appearance of a vertical stripe, angled stripe, and color mixing in an image to be viewed. Particularly, when the temperature of the image pickup device changes, an additional problem occurs that an assignment error varies depending on the change in temperature.

SUMMARY OF THE INVENTION

It is an object of the invention to provide an image pickup apparatus and a method therefor allowing an assignment error to be substantially reduced even when the temperature of the image pickup device changes.

In an image pickup apparatus which comprises an image pickup device including: a plurality of photosensitive cells for converting incident light from a scene to an electric signal charge; a first transfer path for transferring the signal charge read out from the photosensitive cells in a first direction; a second transfer path for transferring the signal charge transferred over the first transfer path in a second direction; an assignment circuit connected to the output end of the second transfer path for assigning the transferred signal charge to a plurality of output channels; a plurality of third transfer paths serving as the output channels and connected to the assignment circuit; and an output circuit connected to the output ends of the third transfer paths, the apparatus being sometimes referred to as "branched-outlet type" or more broadly "split-outlet type" of image pickup apparatus, in accordance with the invention, the apparatus further comprises: a corrector for correcting a transfer error of the signal charge in the image pickup device; and a temperature information providing circuit for providing information depending on the temperature of at least part of the image pickup device, and the corrector is configured to be responsive to the provided information to adjust transfer error correction based.

In an aspect of the invention, the corrector adjusts the transfer error correction based on the provided information. For example, modifying the correction formula in response to a change in temperature allows the assignment error due to a change in temperature to be corrected. In particular, when the device temperature changes, the correction formula for the new temperature can be applied to improve the accuracy of error correction. Three correction formulae for temperatures, for example, 50 degree centigrade, 30 degree centigrade and 10 degree centigrade, may be stored in a memory for error correction at high, normal and low temperatures. The high, normal and low temperatures may be, for example, temperatures of above 40 degree centigrade, from 20 to 40 degree centigrade and below 20 degree centigrade, respectively.

In that case, the apparatus may comprise an estimation value generator for generating an estimation value of the transfer error based on the information, the corrector using the estimation value generated to perform the correction. In particular, the estimation value depends on the temperature, and thus when the device temperature changes to a certain temperature value, the estimation value corresponding to the certain temperature value is selected so as to increase the accuracy of error correction. According to the above concept, a plurality of correction formulae for various neighboring temperature values different by a small amount from one another can be selected on a real-time basis to compensate for the change in amount of signal charges due to a change in temperature, thereby improving the accuracy of error correction.

Further, according to the invention, the above-mentioned split-outlet type image pickup apparatus may comprise: a temperature information providing circuit for providing information depending on the temperature of at least part of the image pickup device; and a transfer controller operative in response to the provided information for increasing or decreasing the number of the third transfer paths used for transfer among the plurality of third transfer paths. When the device temperature changes, the number of the third transfer paths used is reduced to eliminate an assignment error. For example, when there are provided a pair of third transfer paths, only one of the pair of third transfer paths is used, and a signal is output only from one amplifier, thereby preventing an assignment error and eliminating the adverse effect of a difference between the pair of third transfer paths or a difference between the two amplifiers.

In that case, the transfer controller can changes drive of the second transfer path, the assignment circuit, or the plurality of third transfer paths to increase or decrease the number of the third transfer paths used for the transfer.

The transfer may be made for the signal charge generated in each photosensitive cell, and the transfer controller may change spacing between the packets of signal charge transferred over the second transfer path, the assignment circuit and the plurality of third transfer paths to increase or decrease the number of the third transfer paths used for the transfer.

Further, according to the invention, the above-mentioned split-outlet type image pickup apparatus may comprise: a temperature information providing circuit for providing information depending on the temperature of at least part of the image pickup device; and a transfer controller operative in response to the provided information for controlling a rate at which the signal charge is transferred. This configuration is based on the concept that in response to a change in temperature, a transfer rate, e.g. a driving frequency for a transfer path, is changed to reduce an assignment error. This operation is based on the concept that reduction in transfer rate leads to reduction in an assignment error.

Further according to the invention, the above-mentioned split-outlet type image pickup apparatus may comprise: a corrector for correcting a transfer error of the signal charge in the image pickup device; and a temperature information providing circuit for providing information depending on the temperature of at least part of the image pickup device, the corrector being configured not to correct the transfer error when the provided information is higher than a predetermined temperature threshold. An assignment error is reduced at high temperature, and thus assignment error correction is not performed. In this case, the correction is not performed, thereby reducing processing time and power consumption in the apparatus.

Further according to the invention, the split-outlet type image pickup apparatus may comprise: a temperature information providing circuit for providing information depending on the temperature of at least part of the image pickup device; and a temperature controller operative in response to the provided information for controlling the temperature of at least part of the image pickup device to reduce the transfer error. The temperature of at least part of the image pickup device, for example, a branching portion where a second transfer path is split into a plurality of third transfer paths, is increased or decreased by heating or cooling to maintain the temperature to a certain extent, thereby reducing an assignment error due to a change in temperature. Even if an assignment error occurs, a change in assignment error can be reduced. Since the use of a correction formula to correct an assignment error causes the range of change in temperature of the image pickup apparatus to be reduced, the accuracy of the correction formula is improved.

In that case, the apparatus may comprise a transfer controller operative in response to the provided information for controlling a rate at which at least part of the horizontal transfer paths is driven. This configuration is based on the concept that the amount of heat generated in the image pickup device is changed by controlling the drive rate rather than using heating or cooling.

In the latter case, the apparatus may preferably comprise at least one of a display for displaying information on a control state of the transfer controller and a photographing permission circuit for permitting photographing depending on the control state. This configuration is based on the concept that a drive rate is controlled for the purpose of reducing an assignment error, and however the control of a driving rate is in some cases not desirable for some other reason. In order to prevent such an undesirable situation, an alert is sent informing that photographing cannot be reliably performed until the temperature of part of the image pickup device, for example, the branching portion, comes within a predetermined range of temperature, or photographing is prohibited.

According to the invention, an image pickup apparatus and an image pickup method therefor are provided in which an assignment error is substantially reduced even when the temperature of the image pickup device changes.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
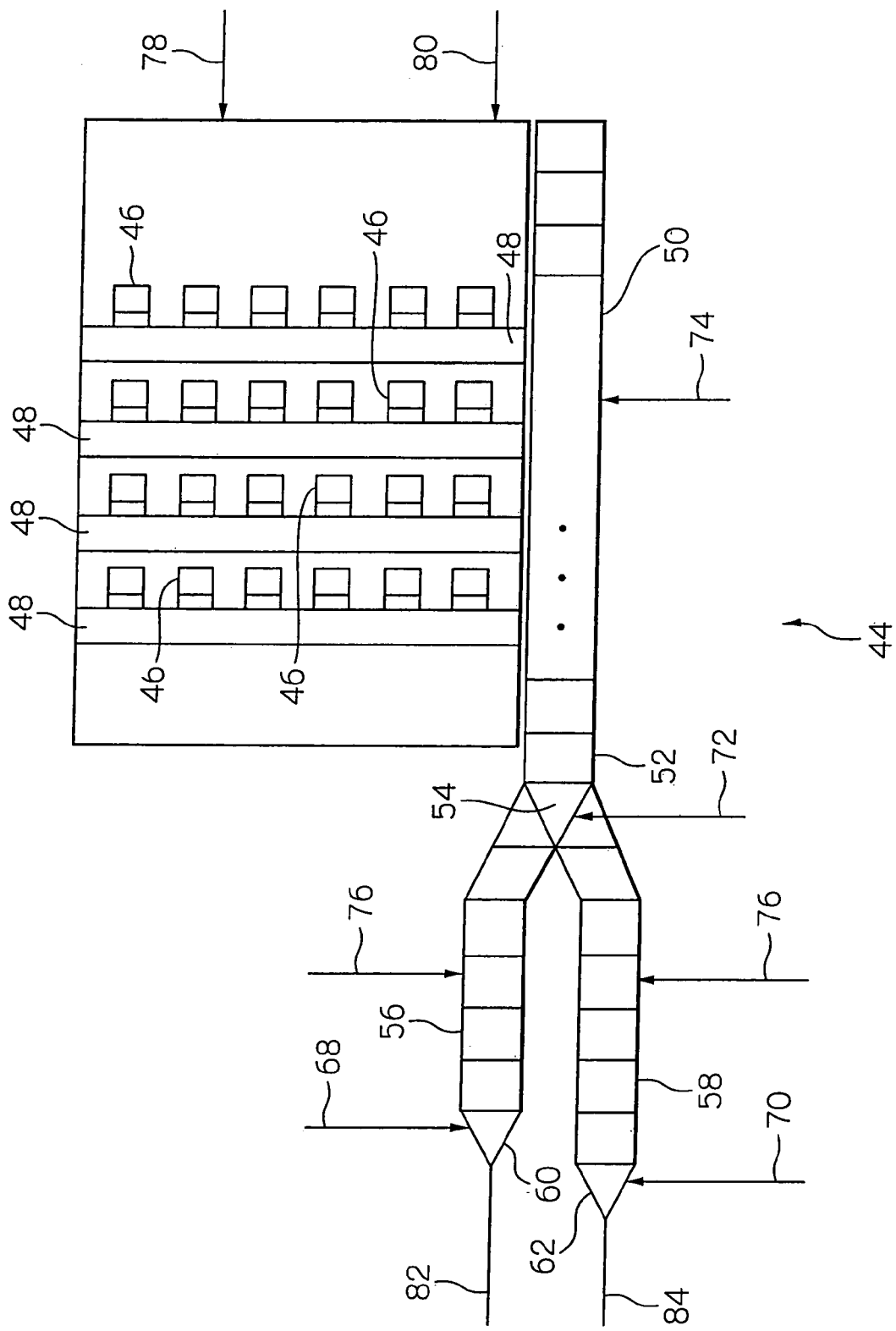
FIG. 1 is a schematic block diagram showing the general configuration of an illustrative embodiment of a branched-outlet CCD type of solid state image pickup device according to the invention.

Embodiments of a solid-state image pickup apparatus according to the invention will be described in detail below with reference to the accompanying drawings. It will first, with reference to FIG. 1, be described how signal charges are transferred in an image pickup device 44 in accordance with an illustrative embodiment of the invention. The image pickup device 44 is configured so that, whenever signal charges corresponding to plural colors are transferred over a horizontal transfer path 50, they will be split, depending on the colors, into respectively corresponding ones of plural horizontal transfer paths 56 and 58 to simultaneously be output, after converted, in the form of analog voltage signals 82 and 84, whereas, whenever signal charges corresponding to one specific color are transferred over the horizontal transfer path 50, they will be transferred to and output from one of the horizontal transfer paths 56 and 58, for example, path 56, when selected, in the form of analog voltage signal 82 after converted.

In the embodiment, a color filter is arranged to separate a light beam 42 incident to the device 44 into red (R), green (G) and blue (B) components. The signal charges of RGB colors in one row, or line, are separated into green signal charges and red/blue signal charges, which in turn are read out. Afterwards, the signal charges of RGB colors in the next row are separated into green signal charges and red/blue signal charges, which in turn are read out. This process is repeated for all rows of pixels forming one frame of image. Therefore, the reading-out sequence is a pulsed progressive readout. Note that the invention is not limited to the specific method for separating signal charges into green signal charges and red/blue signal charges and then reading out the charges, but may be applied to a method for reading out signal charges without separating signal charges into green signal charges and red/blue signal charges.

The signal charges read out from green photo sensitive cells are transferred only over the horizontal transfer path 56. The signal charges readout from red and blue photosensitive cells are transferred over the horizontal transfer paths 56 and 58. The red signal charges are transferred over the horizontal transfer path 56 and the blue signal charges are transferred over the horizontal transfer path 58.

The instant illustrative embodiment is directed to a digital camera 10 including the solid-state image pickup device 44 according to the invention. Note that in the following, parts or elements not directly pertinent to understanding the invention will be omitted from the drawings and description.

Figure 2:
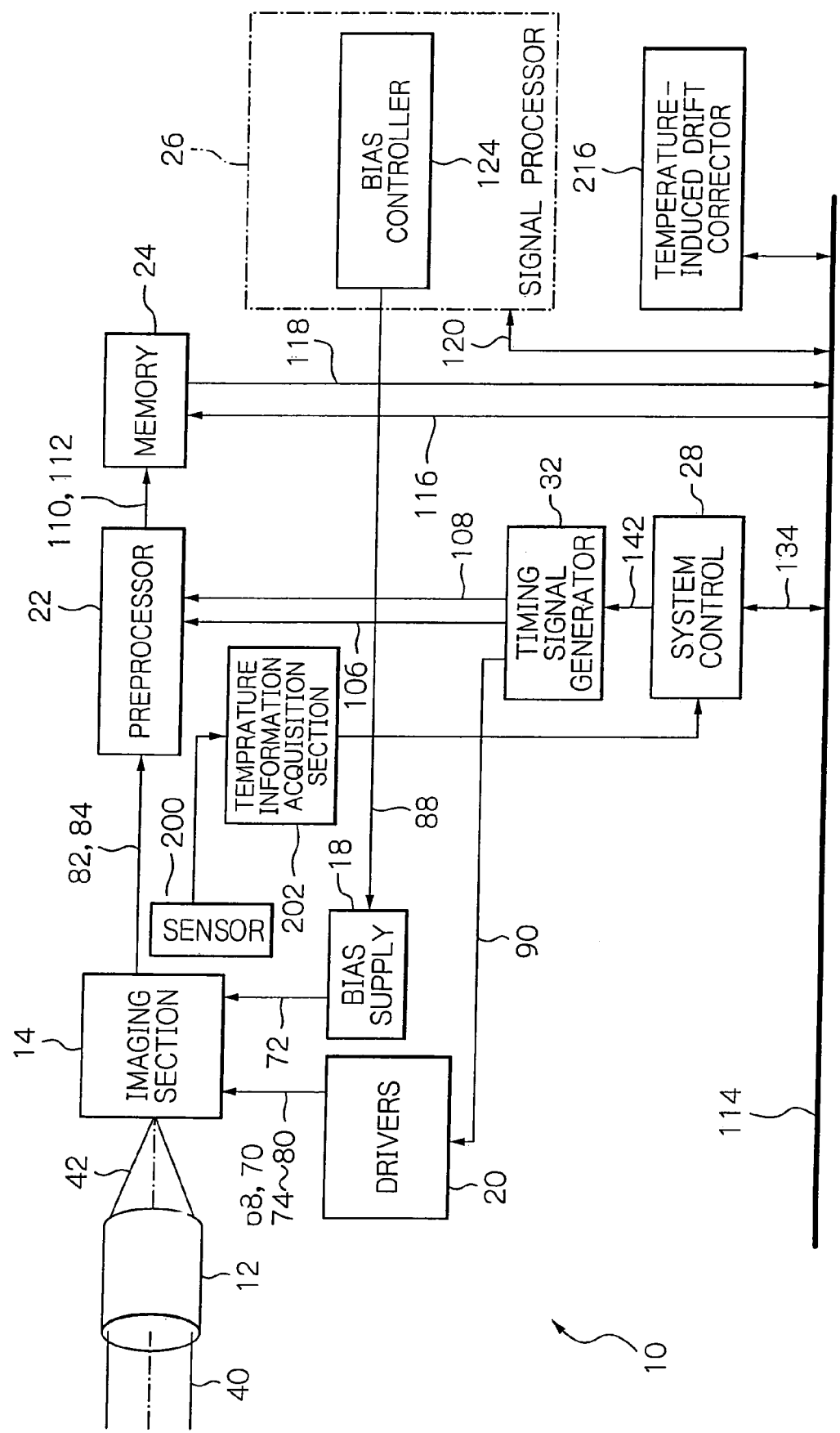
FIG. 2 is a schematic block diagram showing the general configuration of an illustrative embodiment of a digital camera including the solid state image pickup device shown in FIG. 1.

The digital camera 10 comprises, as shown in FIG. 2, an optics 12, an imaging section 14, a bias supply 18, drivers 20, a preprocessor 22, a memory 24, a signal processor 26, a system controller 28, and a timing signal generator 32, which are generally interconnected as illustrated. Further, the imaging section 14 is equipped with a temperature sensor 200 arranged for sensing temperature of the imaging section 14 as temperature-dependent information providing means for providing information dependent on the temperature. Data on the temperature sensed of the imaging section 14 is sent from the temperature sensor 200 to the system controller 28 via a temperature information acquisition section 202.

The digital camera 10 further comprises a temperature-induced drift compensator 216 adapted for receiving the data on the temperature of the imaging section 14 via the system controller 28 to correct a transfer error and adjust the transfer error correction based on the detected temperature, which will be described later in detail. The temperature information providing means for providing information dependent on temperature may be of any kind of means for providing the quantity dependent upon temperature, for example, the amount of dark current of the imaging section 14, which will be described later more in detail.

The optics 12 focuses light 40 incoming from an object scene to be captured onto the imaging surface, i.e. the array of photosensitive cells, of the imaging section 14 to form an optical image of the scene thereon. As shown in FIG. 1, the imaging section 14 includes a solid state image pickup device 44. Although not specifically shown, the color filter has color filter segments disposed in the path of incident light 42 on the array of photosensitive cells of the solid-state image pickup device 44. The color filter separates the incident light 42 into the corresponding color components and the image pickup device 44 is adapted to convert the color components to signal charges which are stored in the photosensitive cells 46 and will be output in the form of electric signal. More specifically, in the solid state image pickup device 44, the signal charges stored in the photosensitive cells 46 are read out to associated vertical transfer paths 48 and transferred successively in the vertical direction of the imaging frame. The solid state image pickup device 44 comprises a horizontal transfer path 50 formed in the direction substantially perpendicular to the vertical transfer paths 48. The signal charges vertically transferred will be transferred to the horizontal transfer path 50.

The horizontal transfer path 50 of the illustrative embodiment has a branching portion 54 formed at its output end 52. To the branching portion 54 are connected respectively the horizontal transfer paths 56 and 58. The horizontal transfer paths 56 and 58 have output amplifiers 60 and 62 formed at their respective output ends. The output amplifiers 60 and 62 are a floating diffusion amplifier. The floating diffusion amplifiers are adapted for converting signal charges to a corresponding analog voltage signal. To the output amplifiers 60 and 62, respectively supplied are reset signals 68 and 70 from the drivers 20. Signals are designated with reference numerals specifying connections on which they appear.

To the branching portion 54, a voltage bias signal 72 of fixed voltage is supplied from the bias supply 18. The branching portion 54 functions as assigning the signal charges transferred from the horizontal transfer path 50 to either one of the horizontal transfer paths 56 and 58, depending on the colors of the signal charges, which will be described in detail later on.

The horizontal transfer path 50 is fed with a horizontal drive signal 74, and the horizontal transfer paths 56 and 58 are fed with a horizontal drive signal 76. The frequency of the horizontal drive signal 76 is equal to half the frequency of the horizontal drive signal 74 when the red and blue signal charges are transferred, and is equal to the frequency of the horizontal drive signal 74 when the green signal charges are transferred. Driving the horizontal transfer paths 56 and 58 in this manner allows a high speed reading operation even when the rated bandwidths of the output amplifiers 60 and 62 are half as wide as the bandwidth of the horizontal drive signal 74. In addition, the solid-state image pickup device 44 is supplied with an overflow drain (OFD) pulse 78 and a vertical drive signal 80.

In this way, the solid-state image pickup device 44 is configured to output two-route output signals 82 and 84 from the output amplifiers 60 and 62 to the preprocessor 22. It will be described later in detail how signal charges are horizontally transferred in the solid-state image pickup device 44.

The bias supply 18 is adapted to supply a bias signal 72 to the branching portion 54 in the form of bias voltage. The bias supply 18 is controlled by a control signal 88 provided from the signal processor 26.

Figure 3:
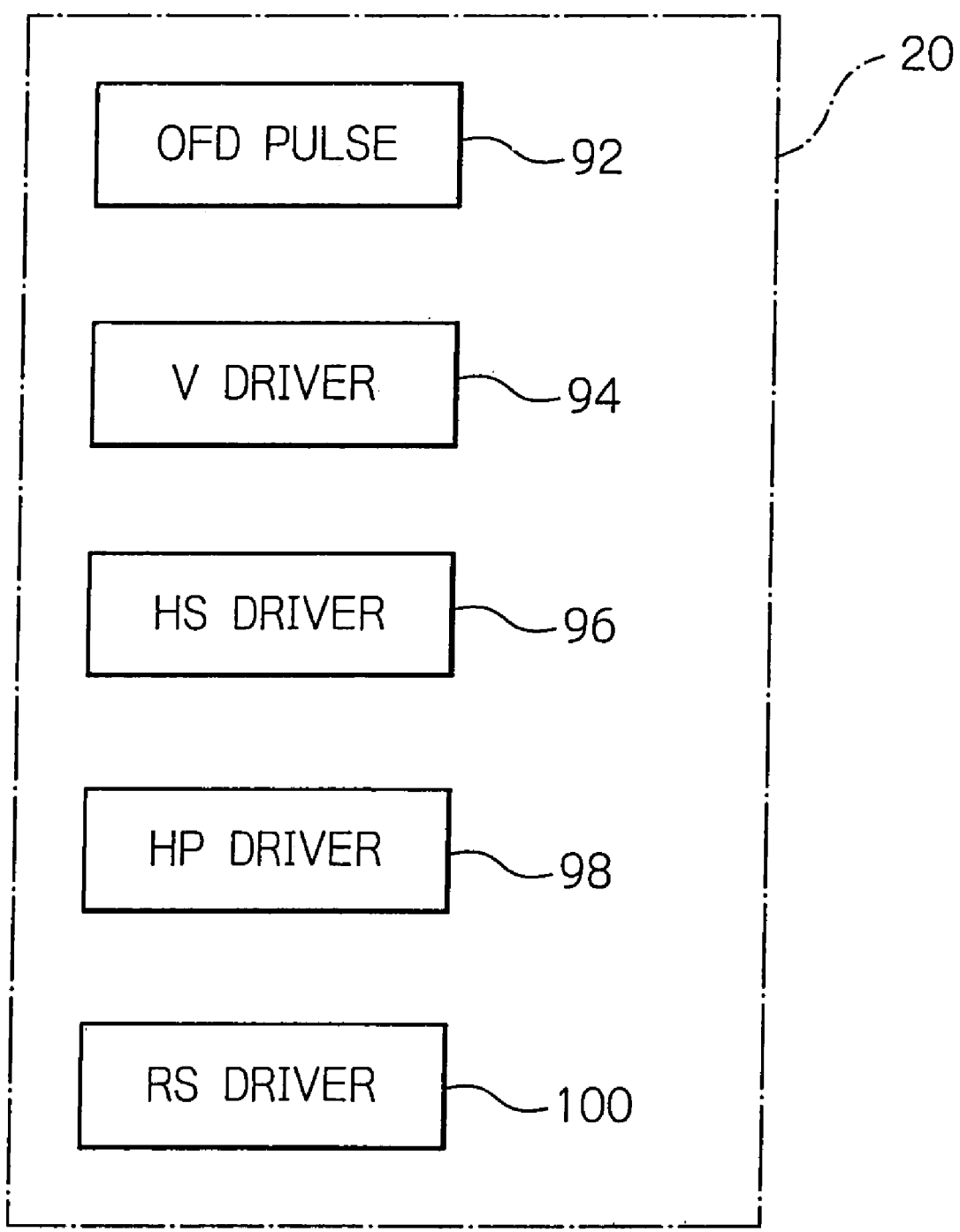
FIG. 3 is a schematic block diagram showing the general configuration of the drivers shown in FIG. 2.

The drivers 20 functions as providing various drive signals for driving the solid-state image pickup device 44. The drivers 20 are provided with a plurality of timing signals 90 from the timing signal generator 32. As shown in FIG. 3, the drivers 20 include an OFD pulse output unit 92, a vertical (V) driver 94, a horizontal-serial (HS) driver 96, a horizontal-parallel (HP) driver 98, and a reset (RS) driver 100. The OFD pulse output unit 92 is adapted to output an OFD pulse 78 to the solid-state image pickup device 44. The V driver 94 is adapted to output a vertical drive signal 80 to the solid-state image pickup device 44.

The HS driver 96 is adapted to output a horizontal drive signal 74 to the solid-state image pickup device 44. The HP driver 98 functions to output a horizontal drive signal 76 to the solid-state image pickup device 44. The period of the horizontal drive signal 76 is equal to or twice as long as the period of the horizontal drive signal 74, depending on the color components of the signal charges being transferred. In this embodiment, the period of the horizontal drive signal 76 is constant and the period of the horizontal drive signal 74 is equal to or one-half the period of the signal 74, depending on the color components of the signal charges being transferred. The RS driver 100 serves as outputting the reset signals 68 and 70 to the solid-state image pickup device 44.

Referring back to FIG. 2, the preprocessor 22 functions as an analog front end (AFE) processor. The AFE function includes a correlated-dabble sampling (CDS) process on analog electrical signals 82 and 84 supplied thereto in order to reduce noise, and digitizing, or analog-to-digital (A/D) conversion, of the signals with thus noise reduced into corresponding digital signals. The preprocessor 22 is supplied with timing or sampling signals 106 and 108 from the timing signal generator 32 for performing the noise reduction and A/D conversion on the streams of input signals 82 and 84.

The preprocessor 22 is thus supplied with the two streams, or routes, of analog electrical signals 82 and 84. However, when only one of the two routes of analog electrical signals is supplied to the preprocessor 22, a supply of either of the timing signals 106 and 108 corresponding to one of the two routes of analog electrical signals causes the CDS sampling and A/D conversion to be performed only on that one route of analog electrical signal. This reduces power consumption of the apparatus. The preprocessor 22 is operative in response to the timing signals 106 and 108 to output one or both of the two routes of digital signals 110 and 112 to the memory 24.

The memory 24 serves as temporarily storing the digital signals 110 and 112 supplied thereto and outputs them. The memory 24 includes line memories, not shown, associated with the respective two routes of digital signals 110 and 112. The memory 24 is controlled by a control signal 116 supplied over a bus 114 in terms of input and output. In response to the control signal 116, the memory 24 outputs the digital signals 110 and 112 input thereto in the form of digital signal 118 to the signal processor 26 over the bus 114 and a signal line 120.

The signal processor 26 serves as processing the digital signal 118 supplied thereto and generates a control signal. The signal processor 26 includes a bias control 124, and an automatic focusing (AF) control, an automatic exposure (AE) control, an automatic white balance (AWB) control, a pixel re-arrangement function, etc., which are not specifically depicted.

The bias control 124 outputs a control signal 88 to the bias supply 18. The bias supply 18 applies a bias signal 72 to the branching portion 54. Further, the AF control adjusts the focal position of a photographing lens of the optics 12 based on image data produced. The AE control determines an evaluated value based on the analysis of image data produced to control an aperture value and a shutter speed. The AF and AE controls send control signals, not shown, to the system controller 28 over the signal line 120, bus 114, and signal line 134. The AWB control adjusts white balance based on image data generated. The pixel re-arrangement function re-arranges image data derived by one or two-route reading out into image data properly associated with the array of color filter segments to assemble a complete frame of image.

The system controller 28 generates a control signal 142 for controlling the horizontal transfer in either of dual- and single-route outputs. The timing signal generator 32 serves as generating and supplying various timing signals, including vertical and horizontal synchronous signals, a field shift gate signal, vertical and horizontal timing signals, an OFD pulse, a reset signal, etc., to the solid-state image pickup device 44 of the imaging section 14. The timing signal generator 32 is operative in response to the control signal 142 from the system controller 28 to generate various timing signals 90, 106, and 108. The timing signal generator 32 outputs various timing signals 90 to the drivers 20. The timing signal generator 32 has a function of generating a reference clock signal, in particular a horizontal timing signal. The timing signal generator 32 frequency-divides the horizontal timing signal to generate two frequencies of horizontal timing signals. The timing signal generator 32 is responsive to the control signal 142 from the system controller 28 to output either one or both of the sampling signals 106 and 108. The digital camera 10 can be operative in that manner, thereby reducing its power consumption.

The structure of the horizontal transfer path 50, branching portion 54 and horizontal transfer paths 56 and 58, and a method for horizontal transfer of signal charges will be described. Description will be made to the charge transfer process from the branching portion 54 to the one horizontal transfer path 56 and from the branching portion 54 to the other horizontal transfer path 58. The horizontal transfer paths 50, 56 and 58 include a plurality of transfer elements formed. Each transfer element is comprised of two poly-crystalline silicon (poly-silicon) electrodes and impurity layers formed on one of the primary surfaces of a silicon substrate. The two impurity layers underlying the two electrodes have structures different from each other. Accordingly, when a drive signal of the same potential is applied to the two electrodes, a step-like potential profile is produced. In the following, one transfer element and two electrodes included in that transfer element are designated by the same reference numeral. For example, "branching portion 54" indicates a transfer element and "electrode 54" indicates the two electrodes of the branching portion 54.

Figure 4:
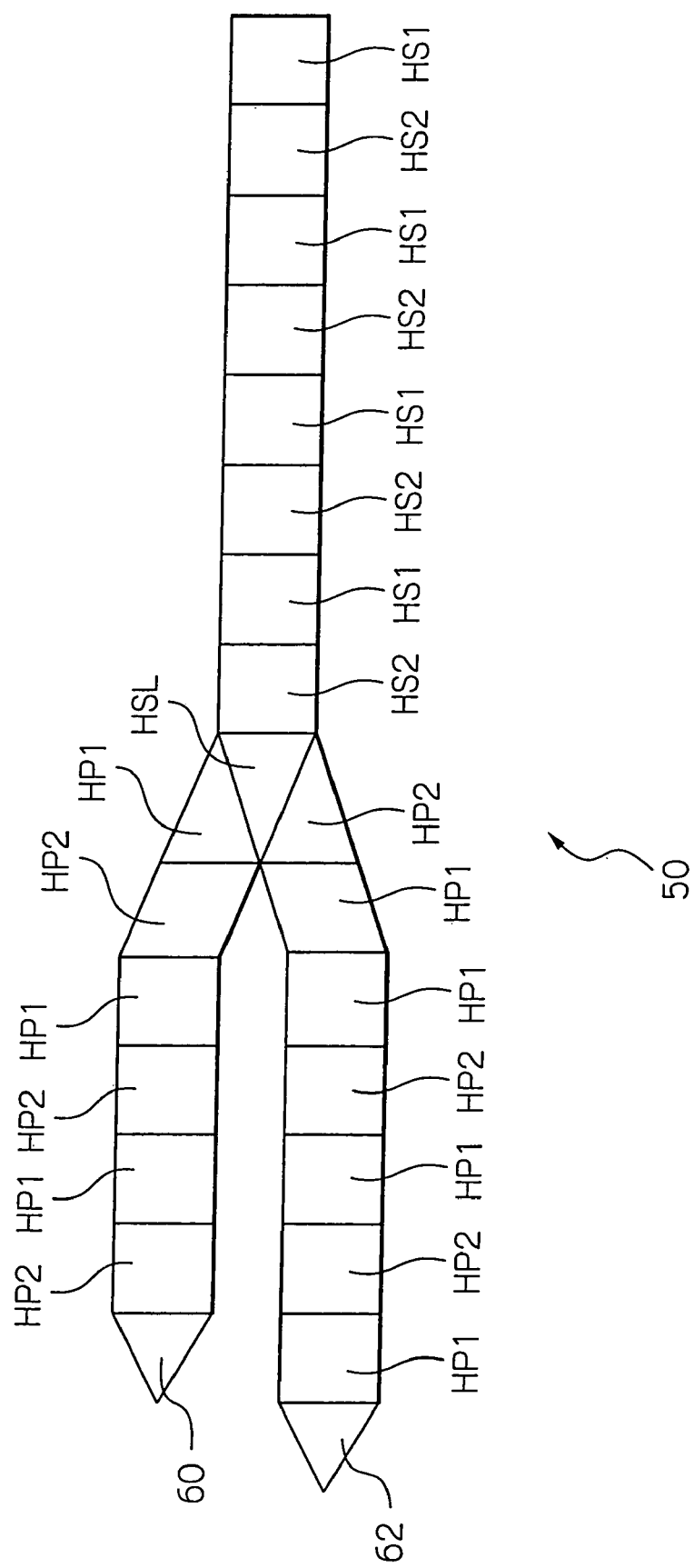
FIG. 4 is a top-down plan view of the horizontal transfer path of the solid state image pickup device shown in FIG. 1.

As shown in FIG. 4, the horizontal transfer paths 50 is configured so that, for example, polysilicon electrodes HS2 and HS1 are formed in this order from right to left in FIG. 1 and disposed toward the branching portion 54 (electrode HSL) and plural pairs of electrodes HS2 and HS1 are repeatedly arranged. The horizontal transfer paths 56 is configured so that six polysilicon electrodes HP1, HP2, HP1, HP2, HP1 and HP2 are formed in a direction from the branching portion 54 to an output amplifier 60. The horizontal transfer paths 58 is configured so that seven polysilicon electrodes HP2, HP1, HP2, HP1, HP2, HP1 and HP2 are formed in a direction from the branching portion 54 to the output amplifier 62.

Figure 5:
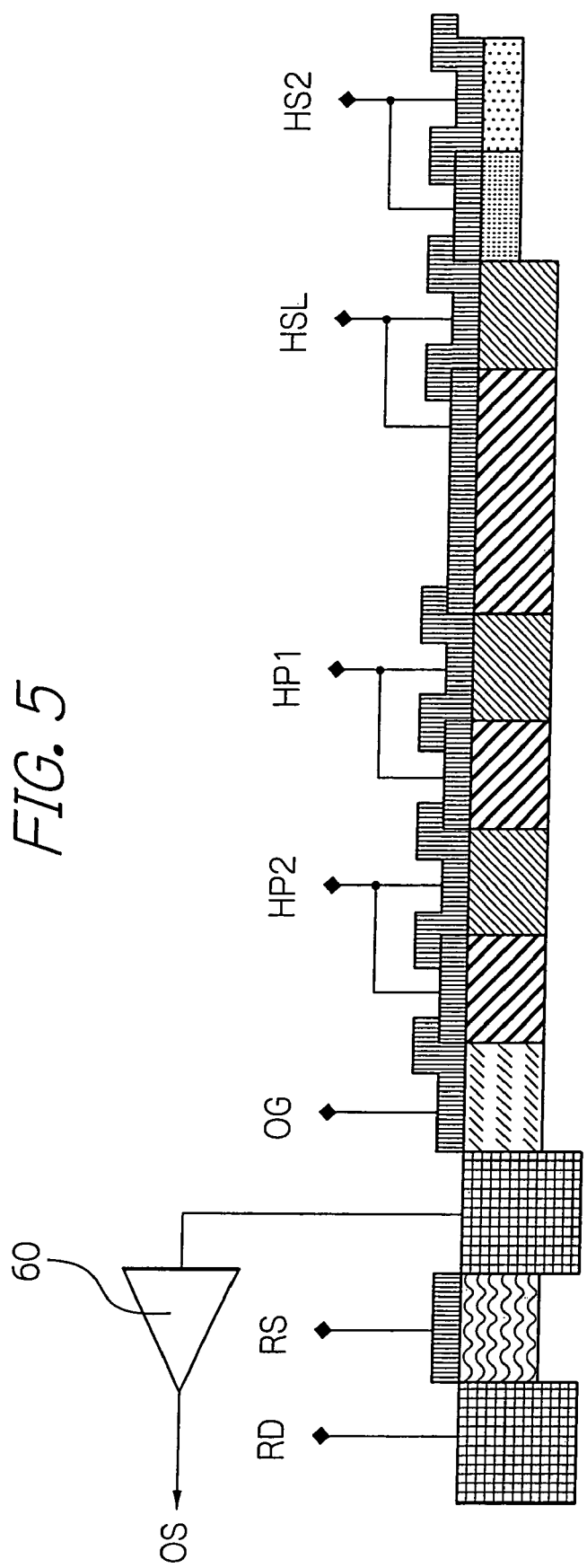
FIG. 5 is a cross sectional view of the primary portion of the horizontal transfer path shown in FIG. 1.

The output amplifier 60 comprises output gate (OG) electrodes, a floating diffusion (FD) section, a reset electrode RS, and a reset drain RD arranged in the direction from right to left in the figure. A cross section from the horizontal transfer path 50 to the reset drain RD is shown in FIG. 5. FIG. 5 shows a cross section from the reset drain RD on the left end to the electrode HP2 of the horizontal transfer paths 50. Only two (HP1 and HP2) of the poly-silicon electrodes HP1, HP2, HP1, HP2, HP1 and HP2 of the horizontal transfer path 56 are shown in the figure.

As can be seen from the cross section, impurity layers are formed in a P-type silicon substrate, not shown, immediately below the respective electrodes. The impurities of the impurity layers are doped by ion implantation, etc., and a potential profile changes depending on the type and concentration of the doped impurities. Further, the voltage level of a drive signal applied to the electrode formed directly above the impurity layer causes a predetermined potential profile to be developed under the electrode, as will be described later.

It will be described how the drive signals are supplied to the individual electrodes. Drive signals øHS1 and øHS2 are supplied to the electrodes HS1 and HS2, respectively. The electrodes HSL is supplied with a drive signal øHSL. The drive signal øHSL has a predetermined bias voltage. The electrodes HP1 and HP2 are supplied with dive signals øHP1 and øHP2, respectively. The electrodes OG is supplied with a drive signal øOG. The drive signal øOG has a predetermined bias voltage. Further, the electrodes RS is supplied with a drive signal øRS. Moreover, the reset drain RD is supplied with a drive signal øRD. The drive signal øRD has a predetermined bias voltage.

Figure 6:
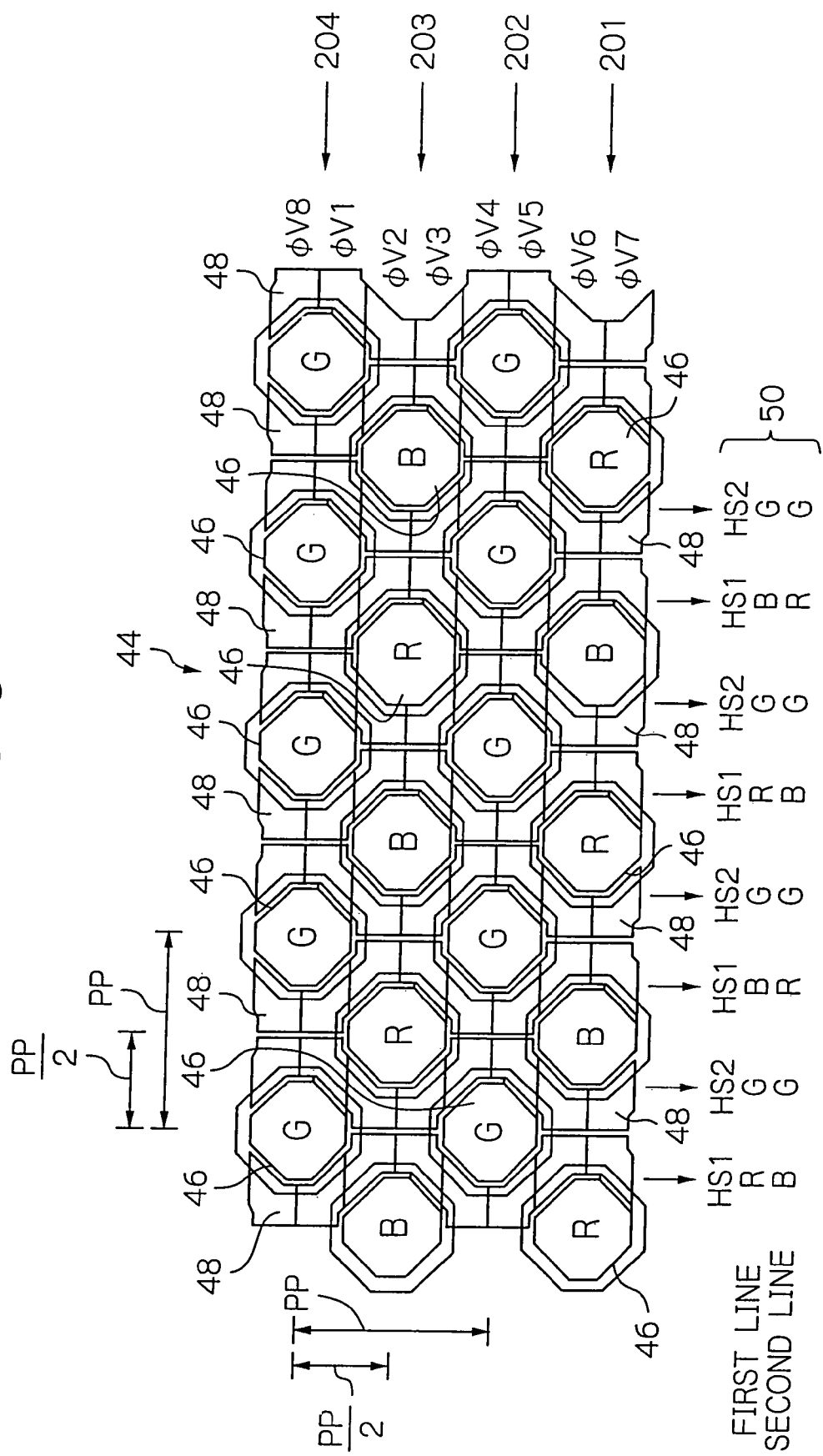
FIG. 6 schematically shows the pattern of color filters mounted and arranged on the solid state image pickup device shown in FIG. 1 with pixels offset diagonally.
Figure 7A:
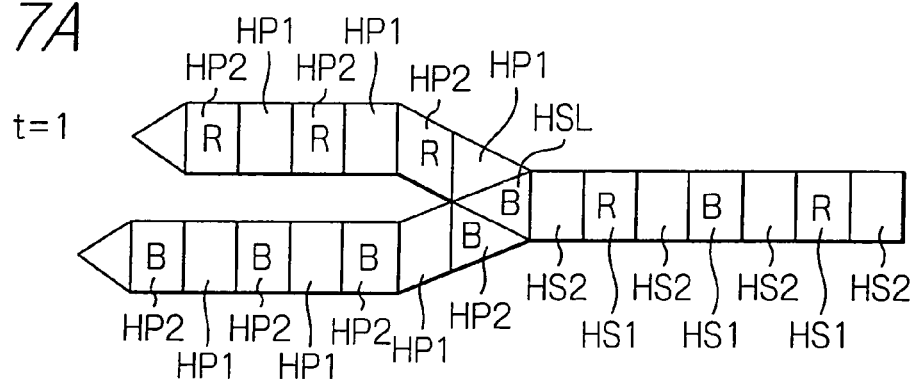
FIGS. 7A-7E are schematic plan views showing how R and B signal charges are transferred over the horizontal transfer paths shown in FIG. 1.
Figure 7B:
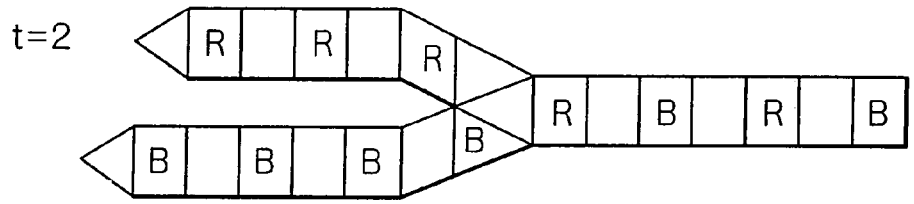
Figure 7C:
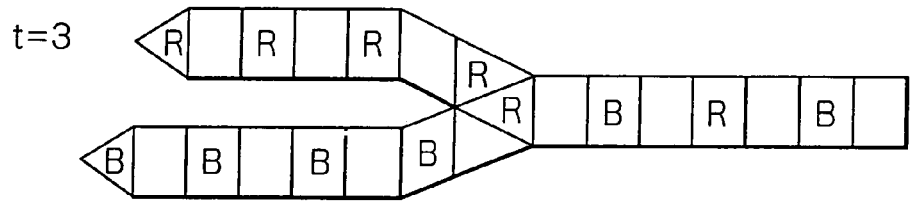
Figure 7D:
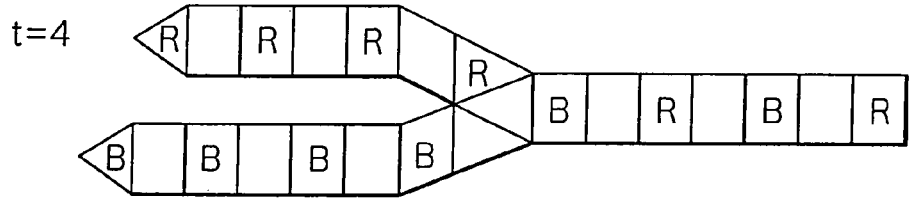
Figure 7E:
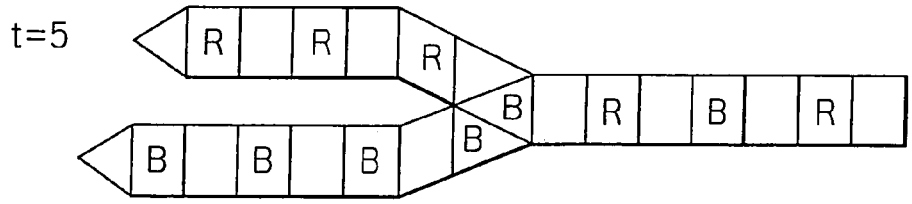
Figure 8A:
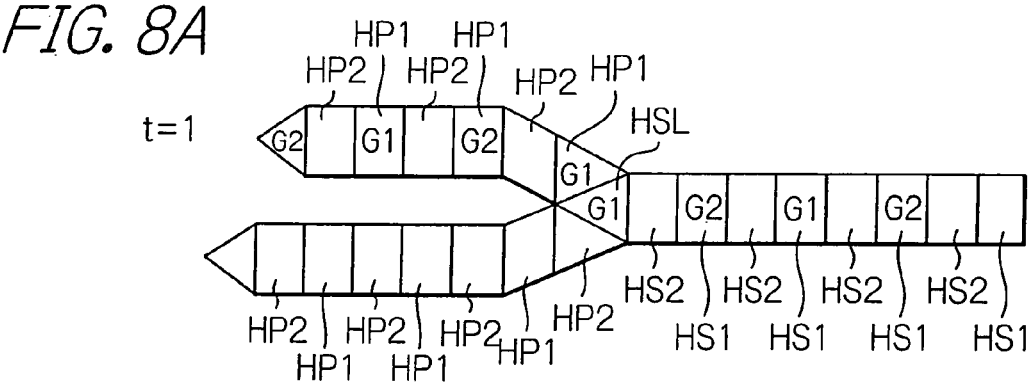
FIGS. 8A-8E are also schematic plan views showing how G signal charges are transferred over the horizontal transfer paths shown in FIG. 1.
Figure 8B:
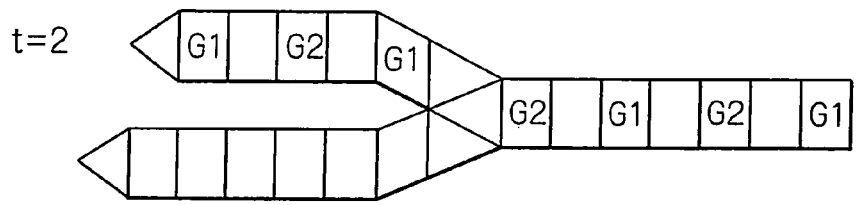
Figure 8C:
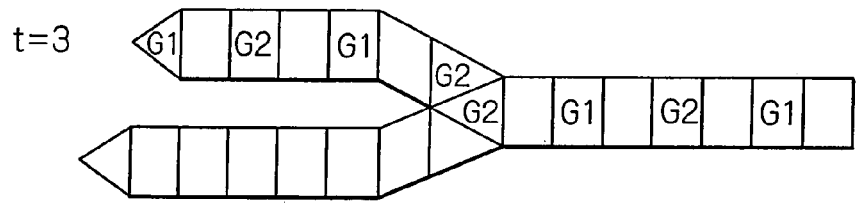
Figure 8D:
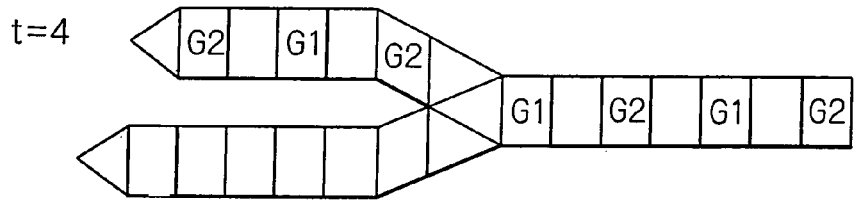
Figure 8E:
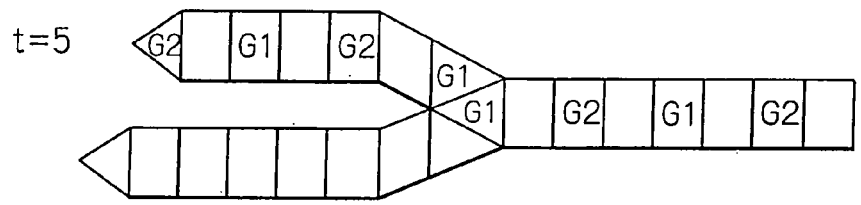

A detailed discussion will be presented on how these drive signals cause the signal charges to horizontally be transferred, including how the charges are vertically transferred before horizontal transfer. The signal charges are first produced in the image pickup device 44 of the imaging section 14. The arrangement of pixels in the image pickup device 44 is illustrated in FIG. 6. As shown in the figure, in the solid-state image pickup device 44 of the embodiment, the photosensitive cells 46 are arranged spaced apart from one another by a spacing, or pitch, PP in parallel rows or lines in the horizontal direction and in parallel columns in the vertical direction of the imaging surface, i.e. imaging frame, with adjacent rows and adjacent columns offset by one-half of the spacing PP of the photosensitive cells 46 in each row and column.

More specifically, a plurality of pixels are arranged in a so-called honey-comb like regular pattern. The color filter placed in the path of light 42 incident on the photosensitive cell 46 is of the three primary colors RGB and has the color filter segments G arranged in a square lattice pattern. The color filter also has color filter segments R and B arranged in an RB complete checkered pattern. In other words, the filter arrangement is generally of a G square and RB complete checkered pattern. In this way, adjacent rows and adjacent columns are offset by one-half of the spacing of the pixels or photosensitive cells 46 in each row and column, and therefore the vertical transfer path 48 is formed so as to detour the pixels and as a result formed in a meandering shape.

The signal charges are read out from lines 201, 202, 203 and 204 in this order and then transferred over the vertical transfer path 48. In this case, color signal charges R, B, R, B, . . . are arranged in the line 201. Color signal charges G, G, G, G, . . . are arranged in the lines 202 and 204. Color signal charges B, R, B, R, . . . are arranged in the line 203. In the horizontal transfer paths 50, 56 and 58, such a regular arrangement of color signal charges are maintained, and the color signal charges R, B, R, B, in the line 201, the color signal charges G, G, G, G, . . . arranged in the lines 202, the color signal charges B, R, B, R, . . . , in the line 203 and the color signal charges G, G, G, G, . . . , in the lines 204 will be horizontally transferred in this order.

It should be noted that the color signal charges R, B, R, B, . . . , in the line 201 and the color signal charges R, B, R, B, . . . , in the line 203 are transferred over the dual horizontal transfer paths 56 and 58, whereas the color signal charges G, G, G, G, . . . , in the lines 202 and 204 are transferred over the one horizontal transfer path 56. Further, the color signal charges R, B, R, B, . . . , in the line 201 and the color signal charges B, R, B, R, . . . , in the line 203 are separated into R signal charges and B signal charges at the branching portion 54, so that the R signal charges are always transferred over the horizontal transfer path 56 and the B signal charges are always transferred over the horizontal transfer path 58.

This operation will be understood from FIGS. 7A through 8E. FIGS. 7A through 7E illustrate how the charges R, B, R, B, in the line 201 and the charges B, R, B, R, . . . , in the line 203 are horizontally transferred at times t=1, 2, 3, 4, 5 in this order. FIGS. 8A through 8E illustrate how the charges G, G, G, G, in the lines 202 and 204 are horizontally transferred at times t=1, 2, 3, 4, 5 in this order after the transfer of the charges arranged in the lines 201 and 203. Times t=1, 2, 3, 4, 5 indicate the time when signal charges are transferred over the horizontal transfer path 50 in the leftward direction in a transfer element-by-element fashion. In the operation shown in FIGS. 7A through 7E, the horizontal transfer paths 56 and 58 are driven by the signal of frequency equal to half the frequency of the signal for driving the horizontal transfer path 50, and thus the transfer rate on the transfer paths 56 and 58 is half of the transfer rate on the transfer path 50. In contrast, in FIGS. 8A through 8E, the horizontal transfer paths 56 and 58 are driven by the signal of frequency equal to the frequency of the signal for driving the horizontal transfer path 50, and thus the transfer rate on the transfer paths 56 and 58 is the same as on the transfer path 50. A method for driving these horizontal transfer paths will be described in detail later on.

These signal charges are processed in the signal processor following the horizontal transfer paths, in order to allow the signal charges arranged in the lines 201 and 202 to produce the first line and to allow the signal charges arranged in the lines 203 and 204 to produce the second line. Incidentally, in the horizontal transfer path 50 shown in FIG. 6, the indication "RGBRGBRGB . . . " placed on the first line and the indication "BGRBGRBGR . . . " placed on the second line show how signal charges from the vertical transfer paths 48 are delivered to the respective locations on the first and second lines of the horizontal transfer path 50, and do not mean that signal charges are transferred over the horizontal transfer path 50 in the orders of "RGBRGBRGB . . . " and "BGRBGRB-GR . . . ", respectively.

Referring back to FIG. 6, when the vertical transfer path 48 is driven by eight-phase drive signals øV1 to øV8, the signal charges read out from the photosensitive cells 46 to the vertical transfer path 48 are transferred over the vertical transfer paths 48 to the horizontal transfer path 50. As already described, the horizontal transfer path 50 comprises the electrodes HS1, HS2, HS1, HS2, . . . formed thereon in the direction from left to right.

In the case where the plurality of pixels are arranged in a honey-comb like regular pattern such that the color filter segments G are arranged in the lattice array pattern while the color filter segments R and B are arranged in the RB complete checkered pattern according to the embodiment, the R and B signal charges in the line 201 and the G signal charges in the line 202 are transferred downward in the figure in the form of separate lines of signal charges. However, in the case of common arrangement of photosensitive cells and color filter segments other than the honey-comb like structure stated above, the R and B signal charges and the G signal charges are not necessarily transferred downward in the form of separate lines of signal charges from each other. The invention may also be applied to the case of such common arrangement.

In addition to rearrangement of G, R and B signals, when selection or decimation are desired, the G, R and B signals should also be rearranged. To this end, for example, a line memory may be disposed between the vertical transfer paths 48 and the horizontal transfer path 50 in order to perform rearrangement, selection, or decimation on G, R and B signals prior to being transferred to the horizontal transfer path 50.

Figure 9:
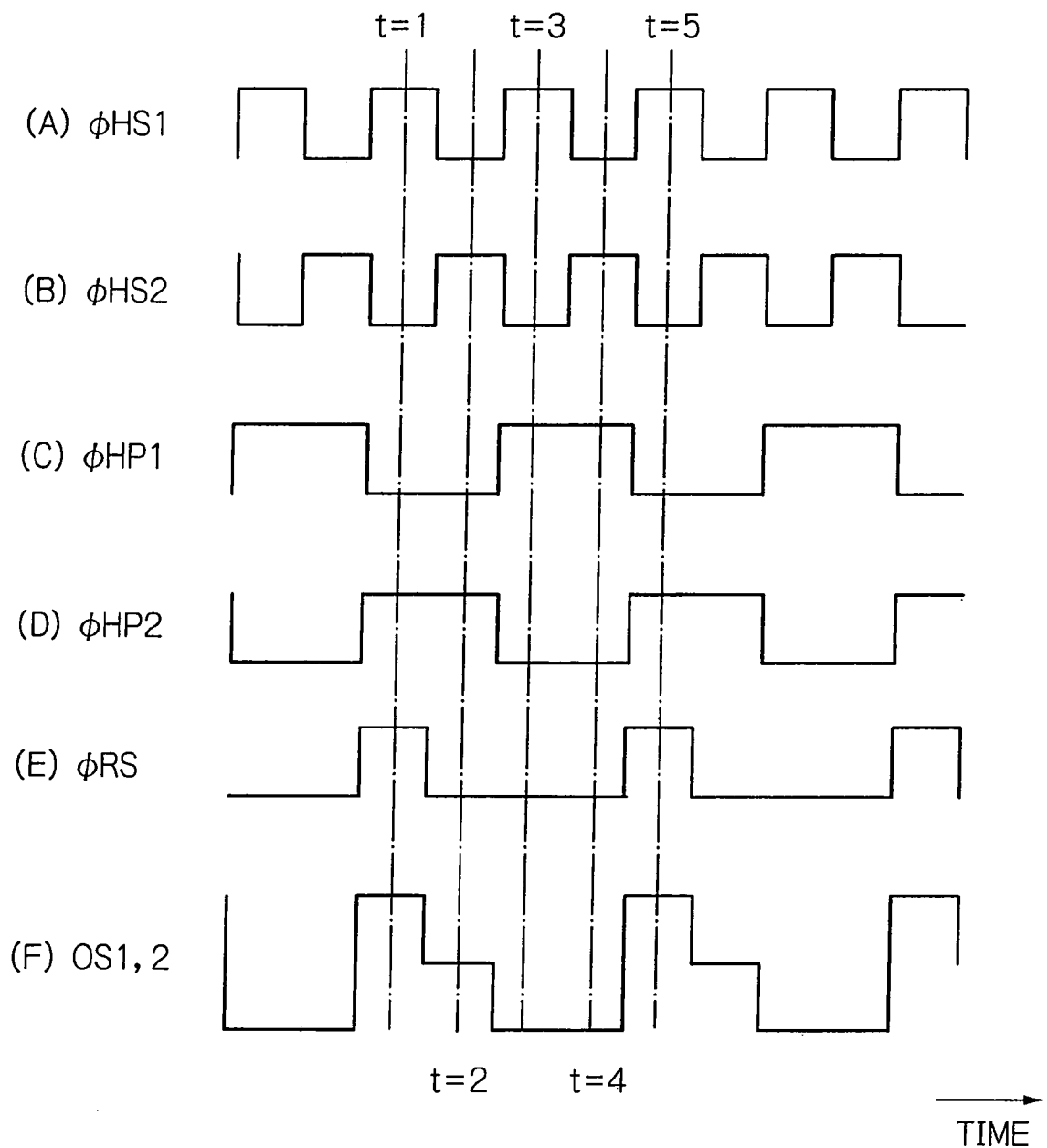
FIG. 9 is a timing chart showing the timing relationship between drive signals applied to the electrodes shown in FIG. 4 when the R and B signal charges are transferred.

It will now be described how the horizontal transfer paths 50, 54, 56 and 58 are driven by drive signals. First, how the signal charges R, B, R, B, . . . , in the line 201 and the signal charges B, R, B, R, . . . , in the line 203 are transferred will be described. FIG. 9 shows drive signals for transferring signal charges R, B, R, B, . . . arranged in the lines 201 and 203. In the following, it will be shown how the phase of a drive signal should be controlled. A drive signal øHS1 in FIG. 9, line (A), is a two-phase drive signal different in phase by 180 degrees from a drive signal øVHS2 in FIG. 9, line (B). Further, a drive signal øHP1 in FIG. 9, line (C), and a drive signal øHP2 in FIG. 9, line (D), are two-phase drive signals of opposite phases.

In the following, it will be shown how the period of a drive signal should be controlled. The period of drive signals in FIG. 9, lines (A) (B), is half the period of drive signals in FIG. 9, lines (C) and (D). That is, the frequencies of drive signals in FIG. 9, lines (A) and (B), are twice as high as the frequencies of drive signals in FIG. 9, lines (C) and (D). As shown in FIG. 9, line (E), the level of drive signal øRS is high "H" at times t=1, 5, . . . , (4n+1), where variable n is either a positive integer or zero. Output signals OS1 and OS2 are output as shown in FIG. 9, line (F).

When these drive signals are applied to the horizontal transfer paths 50, 54, 56 and 58, potential profiles are produced in the horizontal transfer paths 50, 54, 56 and 58, as shown in FIGS. 10A through 14B. The potential profiles shown in FIGS. 10A through 14B are produced in the transfer path within the structure shown in FIG. 5 and a simplified cross section of the structure shown in FIG. 5 is also shown in each shown in FIGS. 10A through 14B to adequately evaluate the potential profile along the cross section.

Figure 10A:
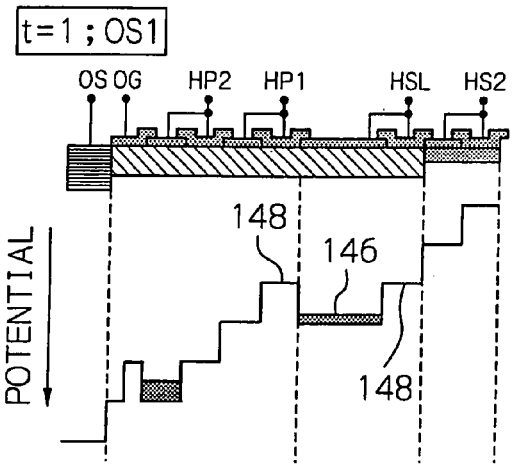
FIGS. 10A-12B show potential profiles produced in the horizontal transfer paths when the drive signals shown in FIG. 9 are applied.
Figure 10B:
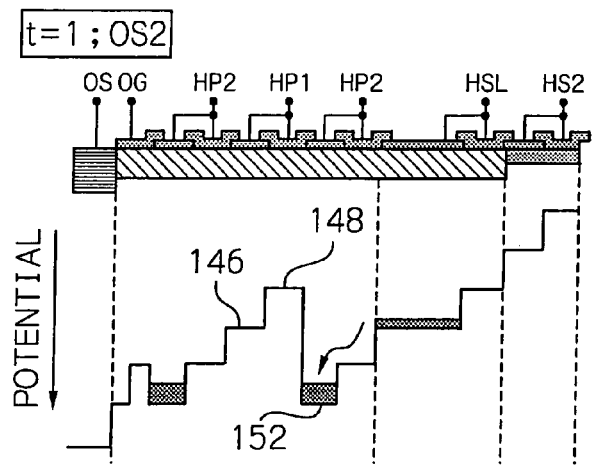
Figure 11A:
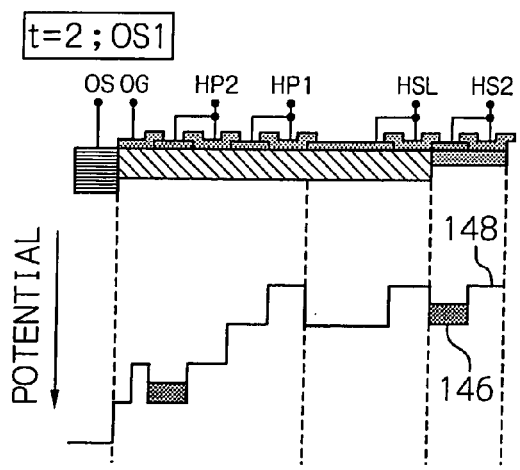
Figure 11B:
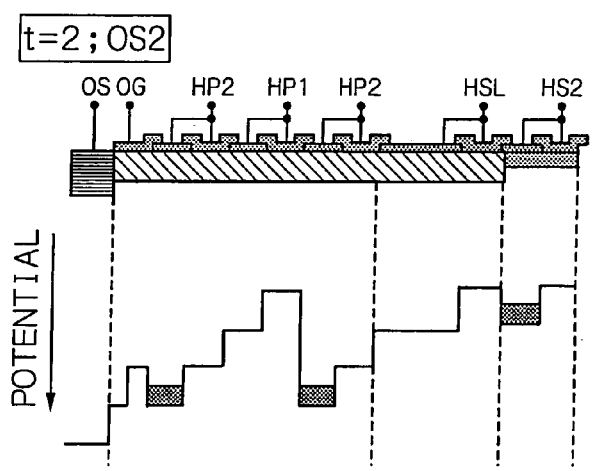
Figure 12A:
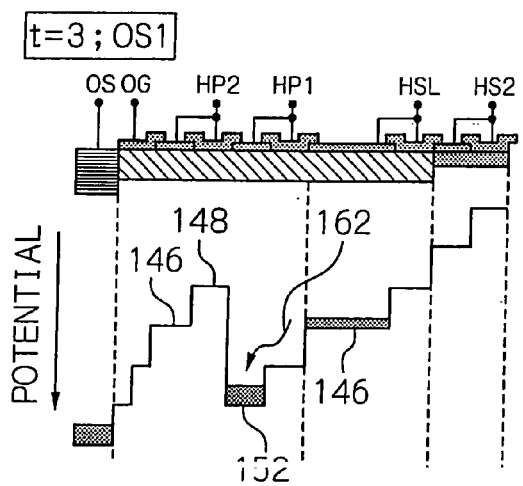
Figure 12B:
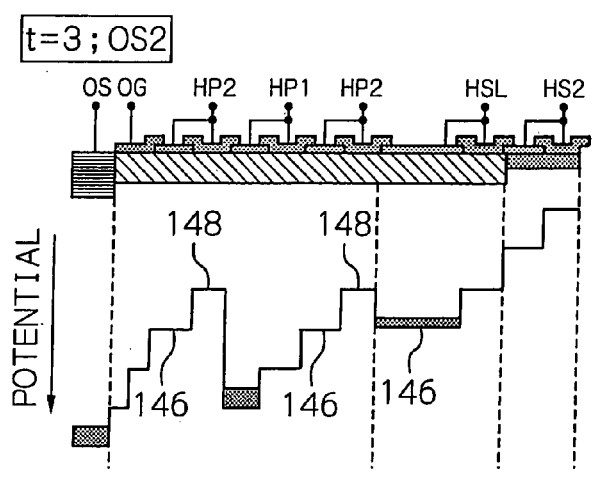
Figure 13A:
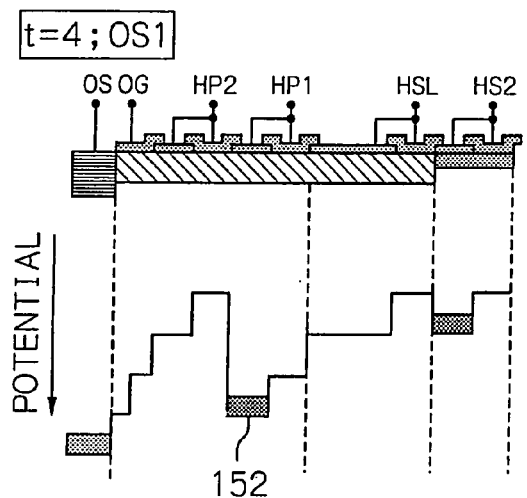
FIGS. 13A-14B show potential profiles produced in the horizontal transfer paths when the drive signals shown in FIG. 9 are applied.
Figure 13B:
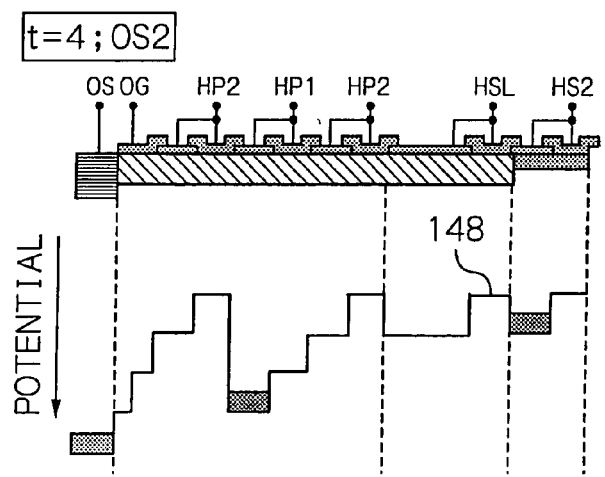
Figure 14A:
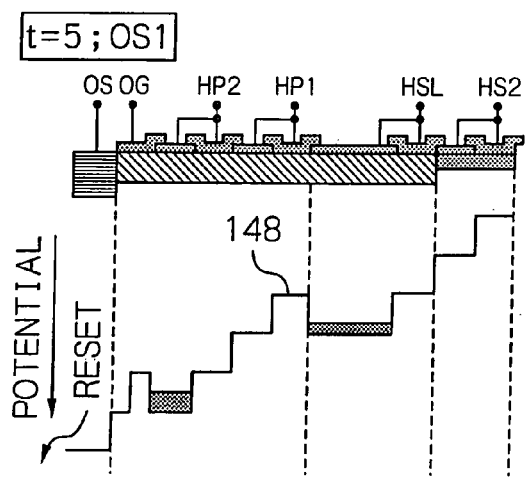
Figure 14B:
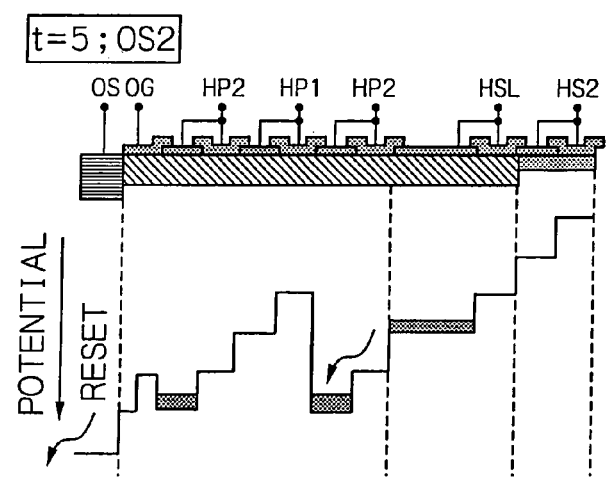

FIGS. 10A and 10B illustrate the potential profile at time t=1 shown in FIG. 7, FIGS. 11A and 11B illustrate the potential profile at time t=2 shown in FIG. 7, and FIGS. 12A and 12B illustrate the potential profile at time t=3 shown in FIG. 7. FIGS. 11A and 11B illustrate the potential profile at time t=4 shown in FIG. 7, and FIGS. 13A and 13B illustrate the potential profile at time t=5 shown in FIG. 7. Further, FIGS. 10A, 11A, 12A, 13A and 14A illustrate the horizontal transfer paths 50, 54 and 56, and FIGS. 10B, 11B, 12B, 13B and 14B illustrate the horizontal transfer paths 50, 54 and 58. Accordingly, as can be seen from the figures, the potential profiles produced in the horizontal transfer paths 50 and 54 and shown in FIGS. 10A, 11A, 12A, 13A and 14A are identical in shape to those shown in FIGS. 10B, 11B, 12B, 13B and 14B.

With reference to FIGS. 9 and 10A through 14B, horizontal transfer will now be described. As shown in FIGS. 10A through 14B, when a drive signal øHSL, not shown, is applied, an electric potential maintained at a substantially constant level (reference level) 146 and a potential barrier 148 for preventing the backflow of signal charges supplied from the horizontal transfer path 50 are produced in a region just below the electrode HSL to which the drive signal øHSL is applied.

Well, it will be described how a potential profile produced varies when a drive signal is applied and signal charges are transferred through the potential wells 146 and 148 maintained at its constant level. In the following, signal charges corresponding to red, green and blue will be referred to as R, G, and B signal charges, respectively. Next, described below first with reference to FIGS. 10A, 11A, 12A, 13A and 14A will be how the R signal charges are transferred over the horizontal transfer path 56.

It will be described below why the illustrative embodiment allows the signal charges from the transfer path 50 by the branching portion 54 to be assigned to the couple of transfer paths 56 and 58. Immediately below the electrodes HP2 and HP1 of the horizontal transfer paths 56 and 58 following the branching portion 54, an impurity layer is formed. Thus, when the electrodes HP2 and HP1 are provided with the logical "H" voltage, a stepwise potential is produced which has a potential level lower by the unitary step than the reference potential 146 always produced in the branching portion 54 by the constant bias voltage and the deepest potential well. This is shown, for example, in FIG. 10B. Further, when the logical "L" voltage is applied to the electrodes HP2 and HP1, a potential level higher by the unitary step than the reference potential 146 and a potential having the same height as the reference potential 146 are produced. This is shown, for example, in FIG. 10A. Thus, as will be described below, the potential produced in the transfer path decreases in the order in the direction of charge transfer in a stepwise fashion. Taking into account the above-described operation, how the transfer paths are driven by drive signals will be described according to a time sequence.

As shown in FIG. 9, at time t=1, drive signals øHS1, øHS2, øHSL, and øHP1 are supplied. The drive signal øHS2 is the logical "L" voltage and the drive signal øHP1 is the logical "L" voltage. When such drive signals are applied, the B signal charges are retained in the branching portion 54. At this instant, a potential 148 or potential barrier for preventing the R signal charges from being transferred to the horizontal transfer path 56 is formed by the logical "L" voltage in the impurity layer below the electrode HP1 of the horizontal transfer path 56 adjacent the electrode HSL.

The drive signal øHP2 consisting of its logical "H" voltage is applied to the electrode HP2 of the horizontal transfer path 58 adjacent the branching portion 54. At this instant, as shown in FIG. 10B, a potential well 152 lower than the reference potential is produced in order to allow the B signal charges to be transferred to the horizontal transfer path 58. In this case, the B signal charges are contained in both charge packets stored in the reference potential well 146 and potential well 152. At time t=1, the R signal charges are accumulated in every other transfer element of the horizontal transfer path 56.

As shown in FIG. 9, line (B), at time t=2, the drive signal øHS2 consisting of the logical "H" voltage is applied to the electrode HS2 of the horizontal transfer path 52. At this instant, a potential 148 and the reference potential 146 are produced in the path under the electrode HS2. When the potential profile is produced in the path under the electrode HS2, a charge packet is established in a potential well underlying the electrode HS2 adjacent to the electrode HSL. The R signal charges are contained in this charge packet. The drive signals consisting of the logical voltage shown at time t=1 are applied respectively to the horizontal transfer paths 56 and 58. Accordingly, the potential profile remain unchanged after time t=1. During this period of time, the B signal charges stored in the path under the electrode HSL are moved under the electrode HP2 of the horizontal transfer path 58, as shown in FIG. 11B.

As shown in FIG. 9, line (B), at time t=3, the drive signal øHS2 consisting of the logical "L" voltage is applied to the electrode HS2. At this instant, the potential profile occurring at time t=1 is produced. When the potential profile is present in the path as described above, the R signal charges contained in the charge packet residing under the electrode HS2 at time t=2 are transferred to the reference potential well 146 under the electrode of the branching portion 54, as shown in FIG. 12A. At this instant, the drive signal øHP1 consisting of the logical "H" voltage is applied to the electrode HP1 of the horizontal transfer path 56 adjacent the electrode HSL. The potential produced in the path under the electrode HP1 is at a potential 152 lower than the reference potential 146. Consequently, the R signal charges are contained in both the charge packets stored in the reference potential well 146 and potential well 152.

At this instant, the drive signal øHP2 consisting of the logical "L" voltage is applied to the electrode HP2 of the horizontal transfer path 58. This causes a potential barrier 148 to be produced in the path under the electrode HP2, as shown in FIG. 12B. The potential barrier 148 prevents the R signal charges from being transferred to the horizontal transfer path 58 and from being mixed with other color signal charges. As shown in FIG. 12A, the R signal charges stored in the branching portion 54 are collected into a charge packet residing under the electrode HP1 of the horizontal transfer path 56.

As described above, the drive signal øHP2 consisting of the logical "L" voltage is applied to the electrode HP2 of the horizontal transfer path 58 adjacent the electrode HSL. At this instant, the potential barrier 148 and the reference potential 146 are produced in the path under the electrode HP2. Further, the drive signal øHP1 consisting of the logical "H" voltage is applied to the electrode HP1 adjacent the electrode HP2. This causes a potential at a level lower by the unitary step than the reference potential 146 and the deepest potential well to be produced in the path under the electrode HP1. Further, when the logical "L" voltage is applied to the electrodes HP2 adjacent the electrode HP1, a potential 148 and reference potential 146 are produced. Consequently, the B signal charges contained in the charge packet present at time t=2 are collected into a charge packet residing under the electrode HP1.

Further, when the potentials 146 and 148 are increased, the R and B signal charges contained in the respective charge packets present at time t=2 and residing under the respective electrodes HP2 positioned immediately before the output portions 60 and 62 of the horizontal transfer paths 56 and 58 are transferred toward the output side and eventually transferred to the FD section via the OG electrode.

At time t=4, the drive signal øHS2 consisting of the logical "H" voltage is applied to the electrode HS2 and a potential profile corresponding to that of time t=2 is produced. Consequently, the B signal charges are collected into a charge packet residing under the corresponding electrode. The R signal charges accumulated in the branching portion 54 are collected and produce a charge packet residing under the electrode HP1 of the horizontal transfer path 56. The drive signal consisting of the logical voltage shown at time t=3 is applied to the electrodes of the horizontal transfer paths 56 and 58 placed following the electrode HP1. The potential profile thus formed is therefore the same as occurring at time t=3.

At time t=5, the same potential profile as occurring at time t=1 is produced in the impurity layer under the electrodes HS2. Consequently, the potential 148 is produced in the path under the electrodes HP1 adjacent the branching portion 54, thereby producing a potential barrier for preventing the B signal charges from being transferred. Thus, the B signal charges can be prevented from being transferred to the horizontal transfer path 56 or from being mixed with other color signal charges. The branching portion 54 acts to further transfer the B signal charges producing a charge packet and transferred over the horizontal transfer path 50 to the horizontal transfer path 58. The drive signal consisting of the logical voltage shown at time t=1 is applied to the horizontal transfer paths 56. Accordingly, the potential profile produced is the same as occurring at time t=1. At time t=5, the R and B signal charges supplied to the FD section are converted to corresponding analog voltage signals, which in turn are output to the output amplifier 60.

How signal charges are transferred over the horizontal transfer path 58 will be described. As in the case with the horizontal transfer path 56, the horizontal transfer path 58 is configured so that an impurity layer is formed in a P-type substrate, not shown, just below the individual electrodes. Further, the impurity layer is defined into regions corresponding in size to the polycrystalline silicon electrodes. Each of the regions of the impurity layer is formed to have a doping concentration which is chosen so that a predetermined potential, described later, is produced in the region in response to the voltage of a drive signal supplied thereto. In the embodiment, it is characteristic that the number of electrodes of the horizontal transfer path 58 is greater by one than that of electrodes of the horizontal transfer path 56.

As shown in FIG. 9, at time t=1, the drive signal øHP2 consisting of the logical "H" voltage, the drive signal øHSL consisting of the constant voltage, and the drive signal øHP1 consisting of the logical "L" voltage are applied to the corresponding electrodes of the horizontal transfer path 58. When the individual drive signals are applied as described above, the B signal charges are stored in the branching portion 54. Incidentally, when the drive signal øHP2 is applied to the electrodes HP2, the potential produced in the impurity layer under the electrode HP2 of the horizontal transfer path 58 adjacent the electrode HSL is at a level lower by the unitary step than the reference potential 146. Further, the potential 148 produced in the layer under the electrode HP1 of the horizontal transfer path 56 acts as a potential barrier for preventing the B signal charges from being transferred to the horizontal transfer path 56.

When the drive signal øHP1 consisting of the logical "L" voltage is applied to the electrode HP1, the potential 148 and reference potential 146 are produced in the layer just under the electrode HP1. The drive signal øHP2 consisting of the logical "H" voltage is applied to the electrode HP2. This causes a potential at a level lower by the unitary step than the reference potential 146 and a deepest potential well to be produced in the layer just under the electrode HP2.

At time t=1, the drive signal is applied as described above and thus a charge packet resides just under each of the electrodes HP2. The B signal charges are contained in the charge packet.

As shown in FIG. 9, at time t=2, the drive signal øHS2 consisting of the logical "H" voltage is applied to the electrode HS2. At this instant, a potential profile is produced in the impurity layer below the electrode HS2 and a charge packet resides under the electrodes HS2, as shown in FIGS. 11A and 11B. The R signal charges are contained in the charge packet. The drive signal consisting of the logical voltage shown at time t=1 is applied to the electrodes of the horizontal transfer paths 58 placed following the electrodes HS2. Accordingly, the same potential profile as occurring at time t=1 is produced.

The potential profile at time t=3 is shown in FIG. 12B. At time t=3, the drive signal øHS2 consisting of the logical "L" voltage is applied to the electrode HS2. At this instant, the potential profile is the same as occurring at time t=1. The R signal charges contained in the charge packet residing under the electrode HS2 at time t=2 are collected and produce a charge packet stored in the potential well 146 in the branching portion 54. At this instant, the drive signal øHP2 consisting of the logical "L" voltage is applied to the electrode HP2 of the horizontal transfer path 58 adjacent the electrode HSL. The potential produced in the layer under the electrode HP2 becomes equal to the potential 148 higher than the reference potential 146. That is, a potential barrier is produced. This prevents the R signal charges from being transferred to the horizontal transfer paths 58. Further, when the logical "H" voltage is applied to the electrode HP1 of the horizontal transfer path 56, a potential 152 is produced. This causes the R signal charges to be transferred as indicated by an arrow 162. As shown in FIG. 12A, a charge packet is stored in the potential well 152 under the electrode HP1 of the horizontal transfer path 56 to which the drive signal øHP1 is applied.

When the drive signal øHP1 consisting of the logical "H" voltage is applied to the electrode HP1 of the horizontal transfer electrode 58, a charge packet is stored in the potential well under the electrodes HP1 at time t=3. The B signal charges are contained in the charge packet under the electrode HP1. When the potentials are increased, the B signal charges contained in the charge packet at time t=2 under the electrode HP2 are transferred toward the output side and eventually transferred to the FD section via the OG electrode.

At time t=4, the same potential profile as occurring at time t=2 is produced in the layer just under the electrode HS2. At this instant, the B signal charges are contained in the charge packet residing under the electrode HS2. The drive signal consisting of the logical voltage shown at time t=3 is applied to the electrodes of the horizontal transfer paths 58 placed following the electrode HS2. Accordingly, the potential profile as occurring at time t=3 is produced. The potential produced in the layer just under the electrode HP2 adjacent the electrode HSL is at the potential 148 higher than the reference potential 146. Further, the potential produced in the layer just under the electrode HP1 of the horizontal transfer path 56 adjacent the electrode HSL is at the potential 152 lower than the reference potential 146.

At time t=5, the same potential profile as occurring at time t=1 is produced. At this instant, the B signal charges are contained in the charge packet residing under the electrode HS2. In this way, the horizontal transfer previously described in conjunction with FIG. 7 is completed. Taking into account the operation described in conjunction with FIGS. 10A through 14B, a description of the operation of horizontal transfer paths will be given with reference to FIG. 7.

During horizontal transfer, the signal charges, for example, the R, B, R, B signal charges transferred from the horizontal transfer path 50 to the branching portion 54 at time t=1 are assigned to the horizontal transfer paths 56 and 58. As can be seen from the horizontal transfer paths 50, 56 and 58 shown in FIG. 7, the signal charges are stored in every other transfer element. The horizontal transfer path 56 transfers only the R signal charges in response to a drive signal applied thereto. Further, the horizontal transfer path 58 transfers only the B signal charges in response to a drive signal applied thereto. In this case, a potential barrier is produced in the horizontal transfer path 56 under the electrode HP1 adjacent the branching portion 54 and thus the B signal charges are prevented from being transferred to the horizontal transfer path 56.

The horizontal transfer path 50 is driven at two times as high as the frequency of the drive signal for driving the horizontal transfer paths 56 and 58. Thus, at time t=2, the signal charges stored in response to a drive signal supplied thereto are horizontally transferred by one transfer element toward the branching portion 54 over the horizontal transfer path 50. In contrast, the level of the drive signal supplied to the horizontal transfer path 56 remains unchanged and thus no transfer of signal charges occurs. Further, the level of a drive signal supplied to the horizontal transfer path 58 remains unchanged and thus no transfer of signal charges occurs. However, since a potential lower than the reference potential 146 of the branching portion 54 is produced in the path under the electrode HP2, the B signal charges stored in the branching portion 54 are collected into a charge packet residing under the electrode HP2.

At time t=3, the signal charges stored in the horizontal transfer path 50 are horizontally transferred by one transfer element toward the branching portion 54. The R signal charges are contained in charge packets that are stored in the branching portion 54 and reside under the electrode HP1 of the horizontal transfer path 56 adjacent the branching portion 54. At this instant, a potential barrier is produced in the horizontal transfer path 58 under the electrode HP2 adjacent the branching portion 54. Thus, the R signal charges are prevented from being transferred to the horizontal transfer path 58. Further, the signal charges stored in the horizontal transfer paths 56 and 58 are horizontally transferred by one transfer element toward the output portions 60 and 62 in response to the level of drive signals supplied thereto. This causes the R signal charges and B signal charges to be transferred to the FD sections of the output amplifiers 60 and 62 of the horizontal transfer paths 56 and 58, respectively.

At time t=4, the signal charges stored in the horizontal transfer path 50 are horizontally transferred by one transfer element toward the branching portion 54 in response to a drive signal supplied to the path. The R signal charges are collected into a charge packet residing under the electrode HP1 of the horizontal transfer path 56 adjacent the branching portion 54.

At time t=5, the signal charges stored in the horizontal transfer paths 50, 56, and 58 horizontally transferred by one transfer element toward the output side. Afterwards, the R and B signal charges are converted to analog voltage signals which are simultaneously output as output signals OS1 and OS2 from the output amplifiers 60 and 62. The output signals OS1 and OS2 are processed in a parallel, concurrent fashion. This eliminates a difference in intensity between the output signals OS1 and OS2 processed over successive time intervals. Incidentally, in the case where a difference in intensity between the output signals processed over successive time intervals is allowable, the output signals OS1 and OS2 may be alternately output.

In this way, the signal charges can be transferred and output while being prevented from being mixed with other color signal charges. In general, as a solid-state image pickup device comes to have a larger number of pixels, the device is required to read out signal charges accumulated in the pixels at a higher speed. To this end, the output amplifiers of the horizontal transfer paths are required to operate in a higher frequency band. It is generally difficult to drive a solid-state image pickup device at a frequency not less than a certain frequency due to, for example, the output amplifier operating in its insufficient frequency band. However, the solid-state image pickup device 44 of the embodiment is configured to divide the output portion of the horizontal transfer path into a couple of horizontal transfer paths. Therefore, the image pickup device 44 is capable of reading out signal charges in a predetermined frequency band, even with the frequency of pulses for driving the horizontal transfer path 50 increased in response to an increase in the number of pixels, without increasing the driving frequency for the output portions 60 and 62. Consequently, the image pickup device is capable of reading out signal charges at high speed.

Well, it will be described how the drive signal are applied to the horizontal transfer paths 50, 54, 56 and 58 to transfer the same color signal charges G, G, G, G, . . . arranged in the lines 202 and 204. When the same color signal charges are transferred, only the one 56 of the two horizontal transfer paths 56 and 58 is used in the embodiment. In this case, the drive signals øHS1 and øHS2 shown in FIG. 15, lines (A) and (B), have the same frequencies as drive signals øHP1 and øHP2 shown in FIG. 15, lines (C) and (D). That is, the drive signals øHS1 and øHS2 are lower in frequency than those shown in FIG. 9.

At time t=1, a drive signal øHS2 applied to the final electrode HS2 of the horizontal transfer path 50 consists of the logical "L" voltage, a drive signal øHP1 applied to the electrode HP1 consists of the logical "H" voltage, and a drive signal øHP2 applied to the electrode HP2 consists of the logical "L" voltage. Accordingly, the signal charges are transferred via the branching portion (HSL) 54 to the path under the electrode HP1, i.e. to the side of the horizontal transfer path 56.

Figure 15:
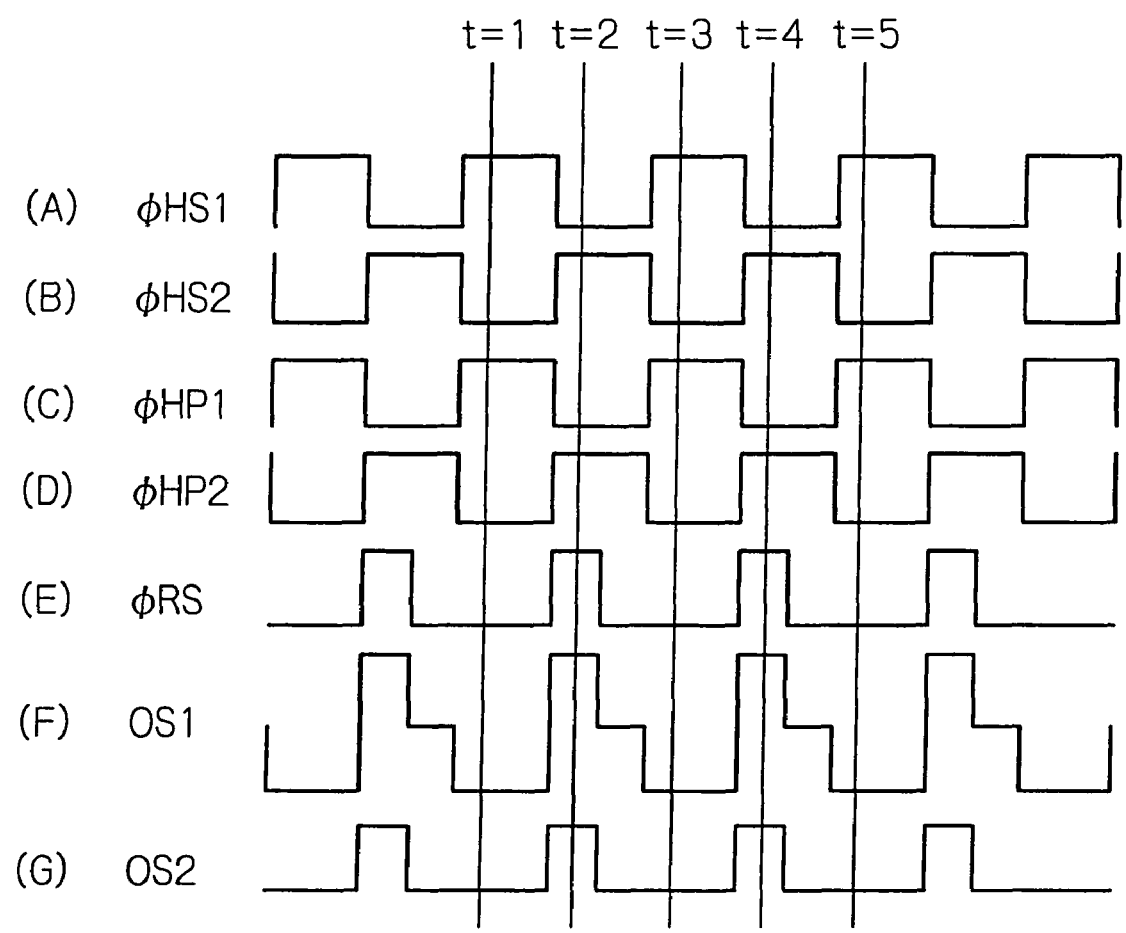
FIG. 15 is a timing chart showing the timing relationship between drive signals applied to the electrodes shown in FIG. 4 when the G signal charges are transferred.
Figure 16A:
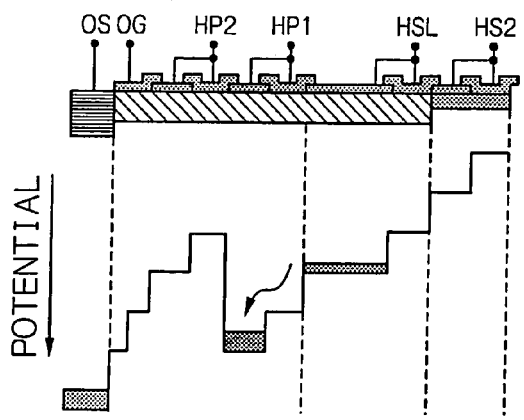
FIGS. 16A-17B show the potential profiles produced in the horizontal transfer paths when the drive signals shown in FIG. 15 are applied.
Figure 16B:
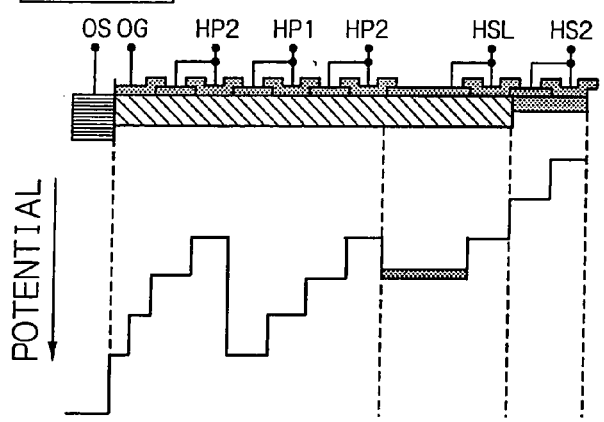
Figure 17A:
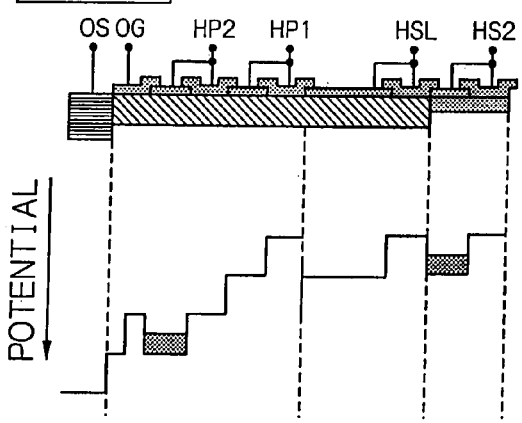
Figure 17B:
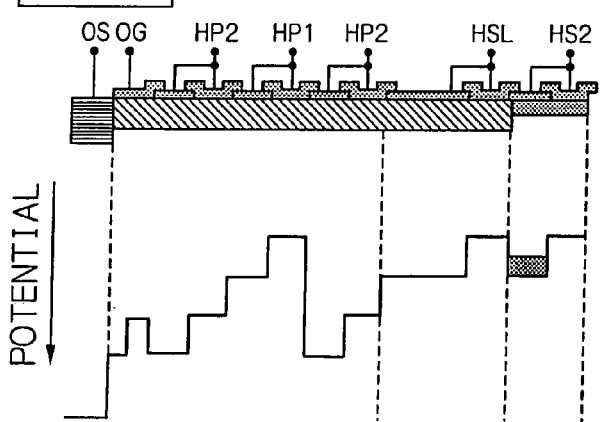

How a potential profile is produced in the horizontal transfer paths 50, 54, 56 and 58 upon application of these drive signals to those horizontal transfer paths is shown in FIGS. 16A through 17B. The potential profile shown in those figures is directed to the structure shown in FIG. 5, and a simplified cross section from the structure shown in FIG. 5 is also shown in FIGS. 16A through 17B to adequately evaluate the potential profile along the cross section. FIGS. 16A and 16B illustrate the potential profile at time t=1 shown in FIG. 15, and FIGS. 17A and 17B illustrate the potential profile at time t=2 shown in FIG. 15. Further, FIGS. 16A and 17A illustrate the horizontal transfer paths 50, 54 and 56, and FIGS. 16B and 17B illustrate the horizontal transfer paths 50, 54 and 58.

At time t=2, a drive signal øHS2 applied to the final electrode HS2 of the horizontal transfer path 50 consists of the logical "H" voltage, a drive signal øHP1 applied to the electrode HP1 consists of the logical "L" voltage, and a drive signal øHP2 applied to the electrode HP2 consists of the logical "H" voltage. Accordingly, the signal charges are present in the transfer element HS2 and transferred from the transfer element HP1 to the transfer element HP2.

The potential profile at time t=3 is the same as the time t=1 and the potential profile at time t=4 is the same as the time t=2. The reason why the potential profiles at the time t=1 and the time t=2 are produced at different times is that the drive signals øHS1, øHS2, øHP1, and øHP2 are of the same frequency and the phases of those signals are adjusted to produce only the two potential profiles.

A reset signal øRS shown in FIG. 15, line (E), is applied to the output portions and the output signals OS1 and OS2 shown in FIG. 15, lines (F) and (G), are output therefrom. In the solid-state image pickup device 44, the output signal OS1 derived from the G signal charges is output only from selected one of the two output portions. The output signal OS2 is not used and thus the output amplifier 62 may be turned off.

It may be contemplated that the drive signals øHP1 and øHP2 and drive signals øHS1 and øHS are inverted in phase so as to allow only the output amplifier 62 to be operated. This causes only the horizontal transfer path 58 to be operated to allow a signal to be output only from selected one of the two output portions. In this way, in the embodiment, it is possible to simply switch between single- and dual-route output mode and to simply select one or both of the output portions.

Figure 18A:
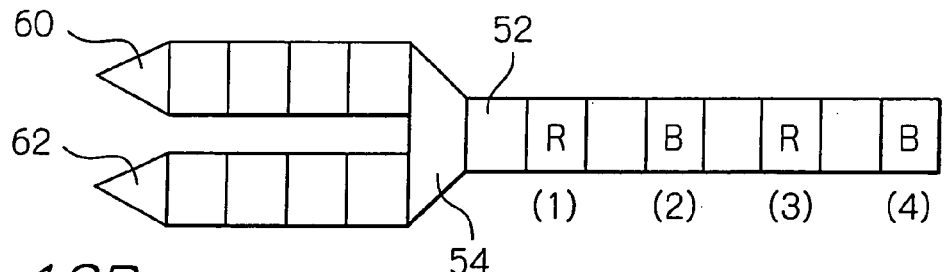
FIGS. 18A, 18B and 18C show how an assignment error occurs in the image pickup device.
Figure 18B:
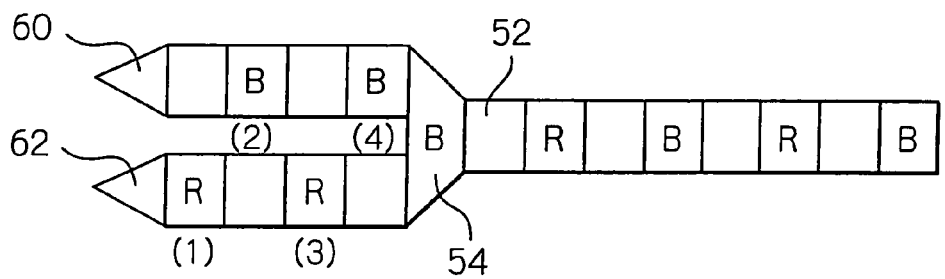
Figure 18C:
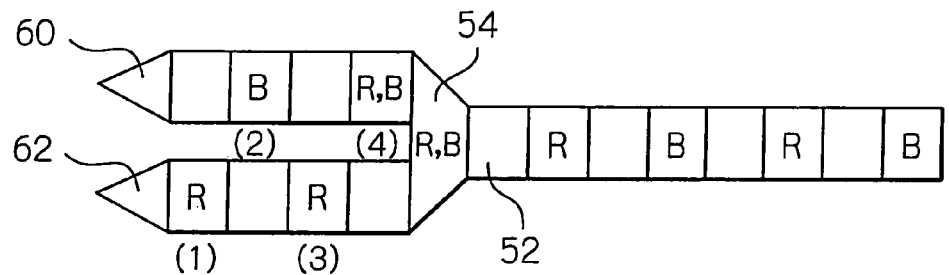

A charge assignment error will be described in connection with the above-described image pickup device 44. The image pickup device 44 includes the plural amplifiers 60 and 62, FIG. 4, provided in the output portion for reading signals at high speed. In this case, as generally shown in FIGS. 18A and 18B, signal charges transferred in the order of, for example, packets (1) to (4) can be assigned so that one group of signal charge packets (1) and (3) and the other group of signal charge packets (2) and (4) are alternately transferred to the lower side amplifier 62 and upper side amplifier 60. FIGS. 18A, 18B and 18C are simplified from the part of FIG. 1. When signal charges of different colors are present in the horizontal transfer path 50, signal charges of the same color are transferred to one of the two amplifiers, and a difference between the two amplifiers is thereby absorbed when white balance adjustment is performed. Accordingly, if there is ideally no error in charge assignment, the difference between the two amplifiers is hardly observed in the resultant image. If an assignment error occurred at the branching portion 54, however, then, as shown in FIG. 18C, part of the R signal charge packet (3) would be mixed into the B signal charge packet (4). Such an assignment error requires correction.

Figure 19A:
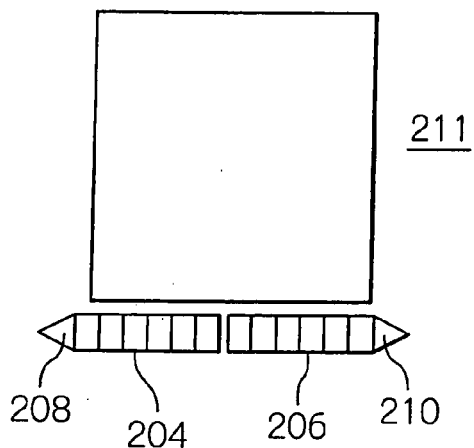
FIGS. 19A and 19B conceptually show examples of an image pickup device having two amplifiers in its output portion.
Figure 19B:
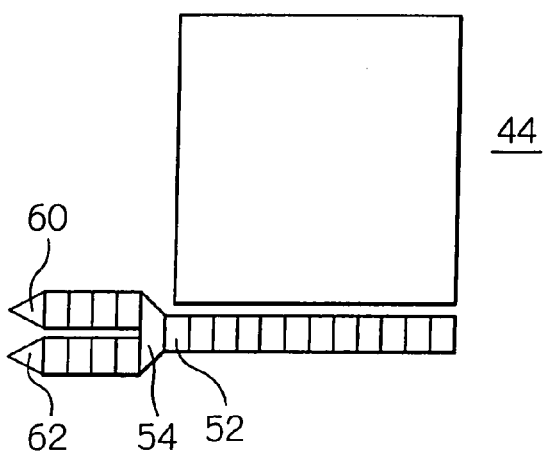

It should be noted that the two amplifiers of the output portion of the embodiment may be alternatively arranged as shown in FIG. 19A. The image pickup device 211 includes a horizontal transfer path which is divided into a left transfer path 204 and a right transfer path 206. This type of image pickup device 211 may be covered by the broader term "split-outlet type" of image pickup device. In this case, the characteristics of left and right amplifiers 208 and 210 for outputting signals may be offset from each other and thus a problem may occur that a difference in property between both amplifiers causes a vertical split in the center of an image frame. FIG. 19B shows the horizontal transfer path of the illustrative embodiment for comparison with the example shown in FIG. 19A. The assignment error in the illustrative embodiment depends on the temperature. The embodiment in which temperature dependency is successfully cancelled out in the course of assignment error correction will be described below.

Figure 20:
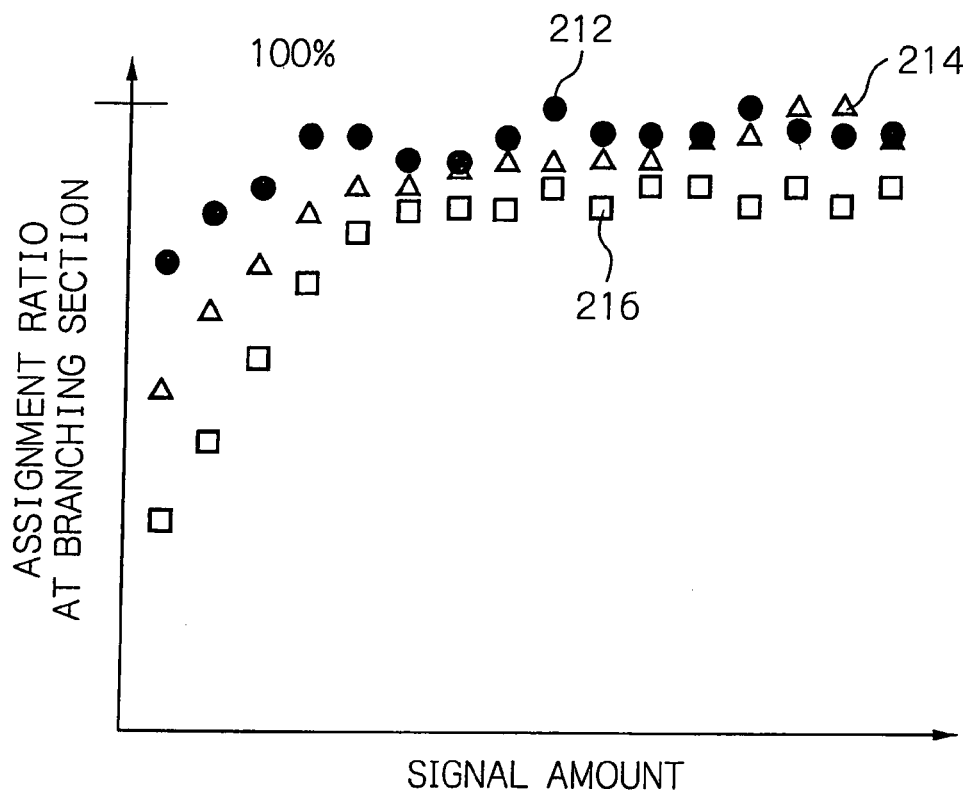
FIG. 20 is a graph showing how the relationship between the amount of signal charges and an assignment ratio varies with the device temperature.

Now, with reference to FIG. 20, it will be described how an error in charge assignment is corrected. FIG. 20 is a graphical representation of how the ratio of charge assignment at the branching portion 54 varies with the amount of signal charges and the temperature, where the abscissa axis indicates the amount of signal charges transferred to the branching portion 54 and the vertical axis indicates the ratio of charge assignment at the branching portion 54. FIG. 20 graphically represents the ratio of charge assignment at the branching portion 54 dependent upon the amount of signal charges when the image pickup device 44 is exposed to high, normal and low temperatures, as an example. Dark dots 212, triangle dots 214, and square dots 216 plot the assignment ratios measured at high, normal and low temperatures, respectively. It should be noted that the relationship between the assignment ratio and the assignment error ratio is such that the sum of both equals 100%.

The assignment error occurring at the branching portion 54 depends on the amount of signal charges transferred into the branching portion 54 and thus the relationship between the amount of signal charges and the assignment error ratio is determined in advance and stored in the temperature-induced drift compensator 216, FIG. 2. It may be contemplated that although the assignment ratios are measured at high, normal, and low temperatures, as shown in FIG. 20, the ratios may be measured at more temperature points. The temperature-induced drift compensator 216 receives data concerning the temperature of the image pickup device 44 from the system controller 28 and the amount of signal charges obtained by photographing from the memory 24 to correct or modify the amount of signal charges in the following manner.

The temperature-induced drift compensator 216 selects, when the temperature sensed by the temperature sensor 200 is relatively high to a certain extent, the assignment ratio corresponding to high temperature, whereas it selects, when the temperature is relatively low to a certain extent, the assignment ratio corresponding to low temperature. Since the assignment ratios are determined in advance with respect to discrete amounts of signal charges, as plotted in FIG. 20, the assignment ratios corresponding to the points other than the dots depicted are determined by linear interpolation of the measurements plotted, or alternatively they may be selected from the measured assignment ratios nearest the point of interest. The measurement values of assignment ratios may be determined prior to shipping of the device 44. It is likely, depending on the structure of the branching portion 54, that the assignment error ratios are different between assigning signal charges to the upper transfer path 56 and assigning signal charges to the lower transfer path 58. It is thus preferable to measure the assignment error ratios for assignment from the branching portion 54 to the lower path 58 and for assignment from the branching portion 54 to the upper path 56.

Figure 21:
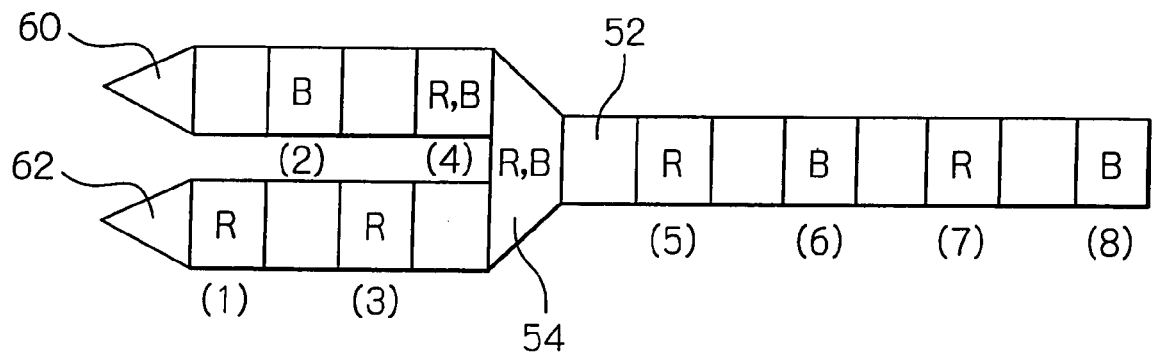
FIG. 21 shows how signal charges are transferred when an assignment error is corrected.

An example of the correcting method will be described with reference to FIG. 21. FIG. 21 shows signal charge packets (1) to (8) are transferred in this order over the horizontal transfer paths 50, 56 and 58 via the branching portion 54. It is assumed the signal charge packet (1) is first transferred.

Prior to correcting an error, the device temperature is measured by the sensor 200, and the temperature-induced drift compensator 216 first selects which one of the assignment ratios corresponding to high, normal, low temperatures should be used. To this end, the temperature data is sent from the temperature sensor 200 via the temperature acquisition section 202 to the system controller 28 and temperature-induced drift compensator 216. The temperature acquisition section 202 converts a signal output from the temperature sensor 200 into a signal format compatible with the system controller 28. For example, the temperature sensor 200 senses a change in electrical resistance to detect a change or fluctuation in temperature, and the temperature acquisition section 202 converts the change in resistance to a corresponding change in voltage to deliver the change in voltage to the system controller 28. Incidentally, although the temperature of the image pickup device 44 is sensed by the temperature sensor 200 placed near the image pickup device 44, it may alternatively be calculated by measuring the amount of dark current flowing in the image pickup device 44.

It is assumed that at the temperature at which the assignment ratios are to be measured, the amounts of signal charges in the packets (1) to (8) before assigned at the branching portion 54 are represented by Sb((1)) to Sb((8)), respectively, and the amounts of signal charges in the packets (1) to (8) after assigned are represented by Sa((1)) to Sa((8)), respectively. Further, it is assumed the assignment error ratios corresponding to the amounts of signal charges in the packets (1) to (8) are represented by k(1) to k(8), respectively. As already noted, k(1) to k(8) depend on the amounts of signal charges.

The amount of signal charges in the packet (1) after assigned can be calculated by subtracting the amount of residual signal charges caused by assignment error from the amount of signal charges before assigned, thus being represented by Sa((1))=(1−k(1))Sb((1)) The amount of signal charges in the packet (2) after assigned can be calculated by adding the amount of residual signal charges in the packet (1) after assigned to the amount of signal charges in the packet (2) before assigned and subtracting the amount of residual signal charges (2) caused by assignment error and remaining in signal charges in the packet (3) from the result of the adding operation, thus being represented by Sa((2))=(1−k(2))(Sb((2))+k(1) Sb((1))). Sa((1)) represents the amount of signal charges output from the corresponding transfer path and thus, if Sa((1)) is known, then k(1) and Sb ((1)) can be calculated. Likewise, if Sa((2)) is known, then k(2) and Sb((2)) can be calculated. This operation is repeated for each of the upper and lower transfer paths to correct an error in the amount of signal charges.

According to the illustrative embodiment, a correction formula is modified in response to a change in temperature to be able to solve the problem of the assignment error depending on the change in temperature. In particular, when the device temperature changes, the correction formula for a new temperature is applied so as to increase the accuracy of correction.

An alternative embodiment of the invention will be described. The previous embodiment uses as an assignment ratio the values originally stored in the memory, etc., of the temperature-induced drift compensator 216. This alternative embodiment is characterized in that in order to improve the accuracy of correction, an assignment ratio is calculated for a temperature of the image pickup device 44. As already described in the previous embodiment, the assignment ratio depends on the amounts of signal charges and thus, when the assignment ratio is calculated, the amount of signal charges should be changeable to provide an assignment ratio.

Figure 22:
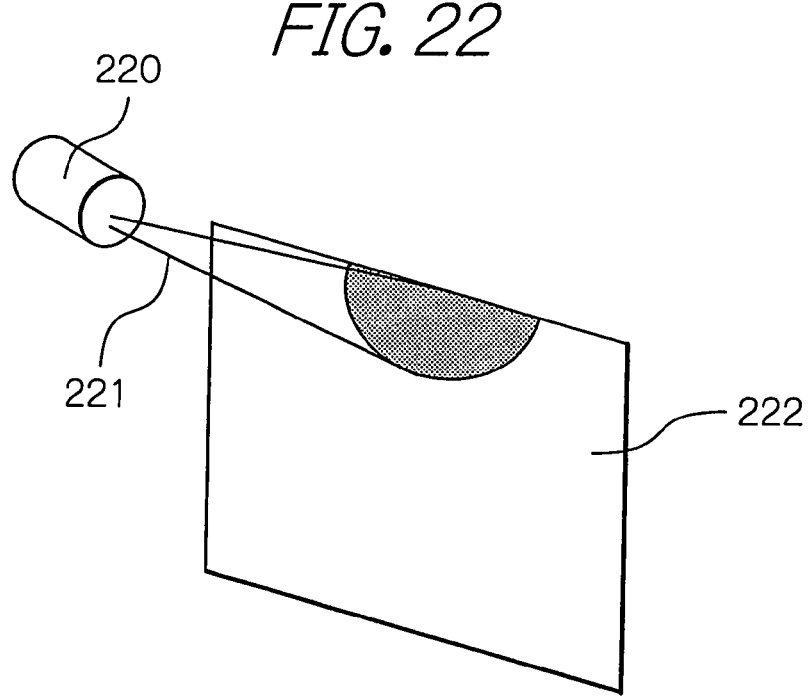
FIG. 22 is a schematic diagram useful for understanding a method for changing the amount of signal charges to calculate an assignment ratio.
Figure 23:
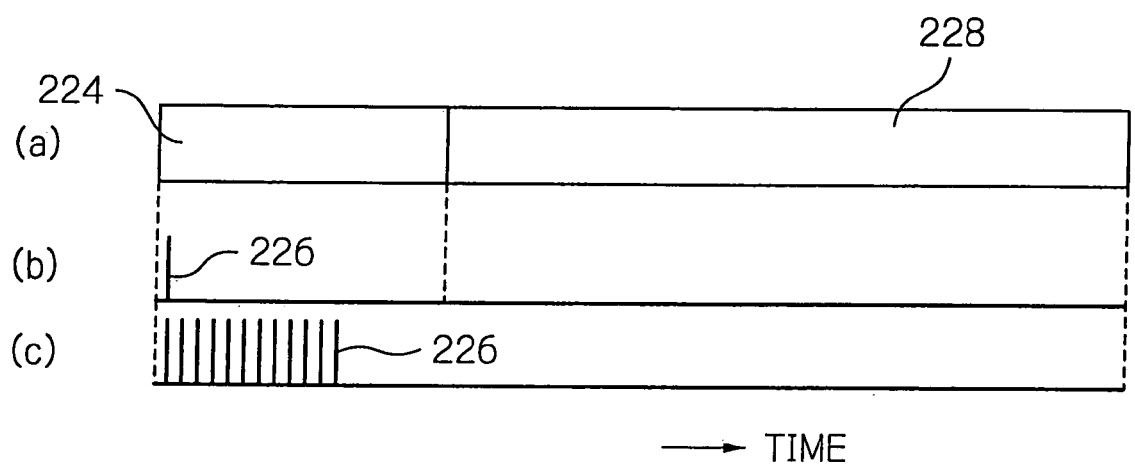
FIG. 23 is a schematic diagram also useful for understanding another method for changing the amount of signal charges to calculate an assignment ratio.

As shown in FIG. 22, a method for changing the amount of signal charges is provided including irradiating light 221 from a light source 220 onto the imaging surface 222 of the imaging device 44 so as to change the amount of signal charges generated by light incident 221 on the camera. With reference to FIG. 22, it will be described how an object is imaged and an assignment ratio is provided. The light source 220 may emit light 221 such that the light 221 from the light source 220 is directed only to a portion of, or to the entirety of thee imaging surface 222. An exemplified method for changing the amount of signal charges is to change the brightness of the light source 220. Further, as shown in FIG. 23, an example of the method for changing the amount of electric charges, i.e. signal charges, to be accumulated is to change the times, i.e. pulses, of electronic shutter 226 in a period of exposure time 224. Alternatively, the exposure time 224 can be extended. FIG. 23, line (a), shows the exposure time 224 followed by a readout period 228, and lines (b) and (c) show the cases where the electronic shutter 226 is operated, or released, when the amount of signal charges is to be decreased and increased, respectively.

While the amount of signal charges is changed as in the cases of FIG. 22 or 23, the amount of signal charges is acquired so that the amount of signal charges is correlated with the assignment ratio. One of the exemplified methods for determining an assignment ratio is to cause one of the couple of amplifiers 60 and 62 to output only the amount of signal charges per se assigned thereto and the other amplifier to output only charges corresponding the amount of residual signal charges caused by assignment error. This operation is shown in FIGS. 24A, 24B and 24C.

Figure 24A:
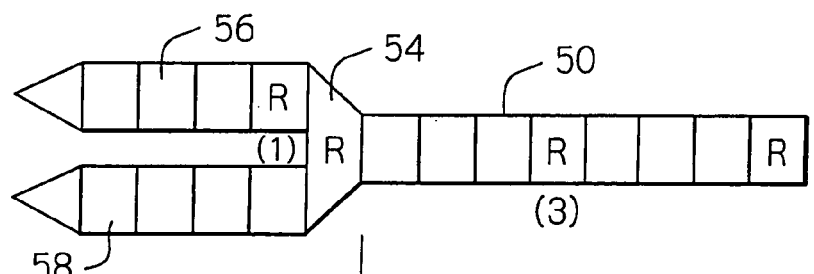
FIGS. 24A-25C show methods for calculating and determining an assignment ratio.
Figure 24B:
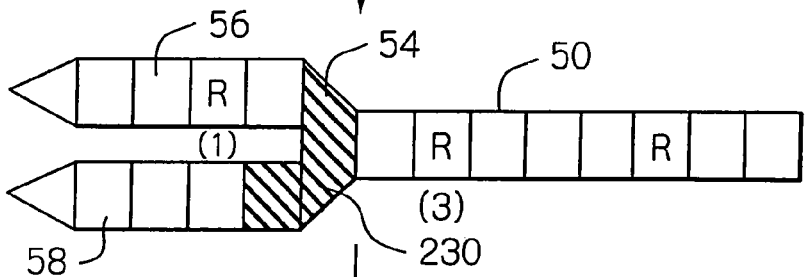
Figure 24C:
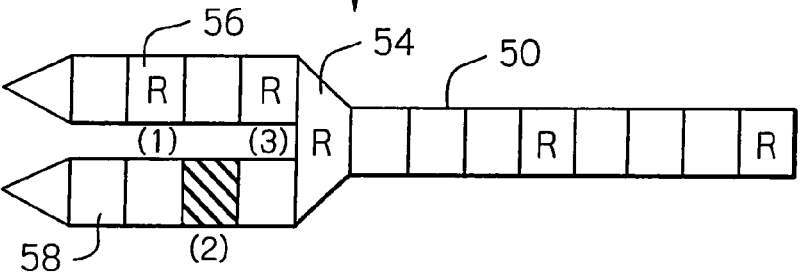

FIGS. 24A, 24B and 24C illustrate a method for determining an assignment ratio for signal charges transferred over the transfer path 56. In the illustrative case, the situation is assumed where only the R signal charges shown in FIG. 7 are output without outputting the B signal charges shown in FIG. 7, and further, spacing between adjacent packets of signal charges is twice as long as shown in FIG. 7. This may be accomplished, for example, by providing gates so as to allow only the R or B signal charges to be transferred from the vertical transfer paths 48 to the horizontal transfer path 50 during signal charge transfer. Only the R or B signal charges are transferred to the horizontal transfer path 50, and thereafter the signal charges are transferred over the horizontal path 50, as previously described.

FIGS. 24A, 24B and 24C respectively show where the packets of signal charges are each time the signal charges are transferred over the horizontal transfer path 50 by two transfer elements. Each time the packets of signal charges in the horizontal transfer path 50 are transferred by two transfer elements, packets of signal charges in the horizontal transfer paths 56 and 58 are transferred by one transfer element. The correctly assigned packet of signal charges (1) is transferred over the horizontal transfer path 56. A cross-hatched area 230 in FIG. 24B indicates the signal charges that are not assigned to an intended transfer path, i.e. incorrectly assigned signal charges, and the incorrectly assigned signal charges (2) are present in and will be transferred over the horizontal transfer path 58. Thus, the amount of the signal charges (2) can be known while the amount of residual signal charges (2) caused by assignment error to be transferred over the horizontal transfer path 56 can be determined.

Figure 25A:
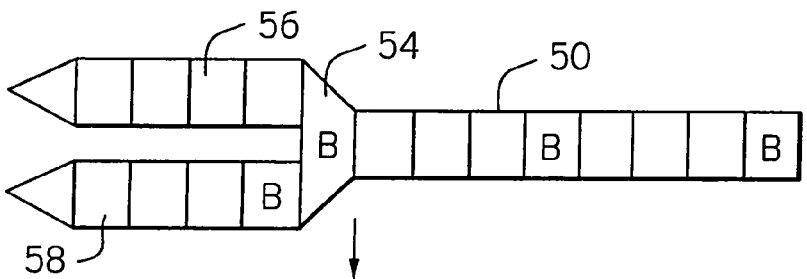
Figure 25B:
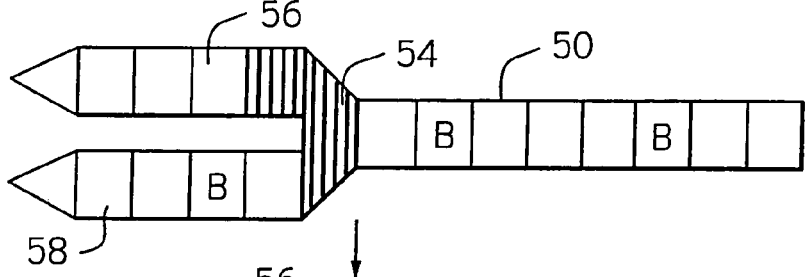
Figure 25C:
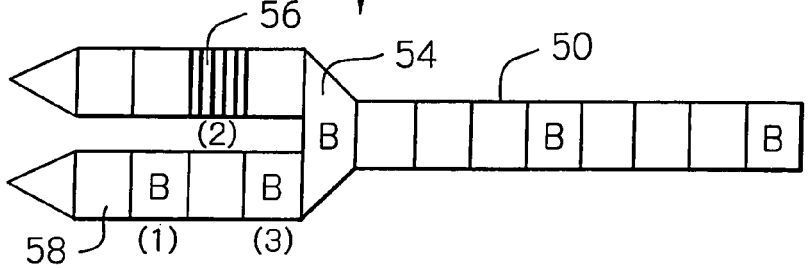

Likewise, as shown in FIGS. 25A, 25B and 25C, only the B signal charges are transferred in the same manner as shown in FIGS. 24A, 24B and 24C, and thus the amount of residual signal charges caused by assignment error to be transferred over the horizontal transfer path 58 can be determined.

According to the alternative embodiment, a plurality of correction formulae used to compensate for a change due to temperature change can be obtained on a real-time basis in response to small segments of change in temperature and thus correction accuracy can be improved.

Another alternative embodiment of the invention will now be described. This alternative embodiment may be the same as the foregoing embodiments except that, instead of using the method for changing an assignment ratio to correct a change due to temperature change, when the device temperature is higher or lower than the normal temperature, a use is made of a method for driving the horizontal transfer paths in a manner different from that used for the normal temperature to drive only one of the horizontal transfer paths 56 and 58.

Figure 26A:
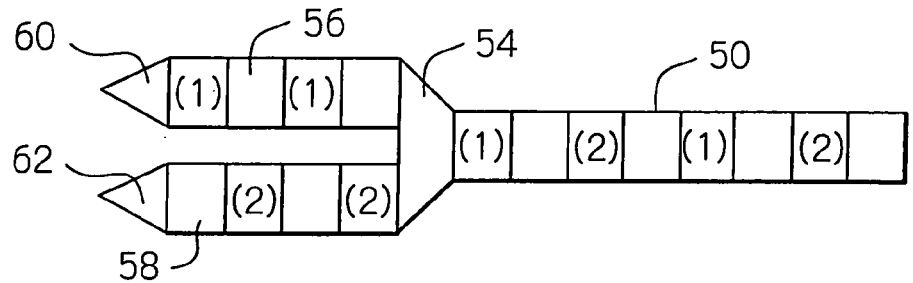
FIGS. 26A through 27B show exemplified methods for changing the timing relationship between drive signals depending on the device temperature.
Figure 26B:
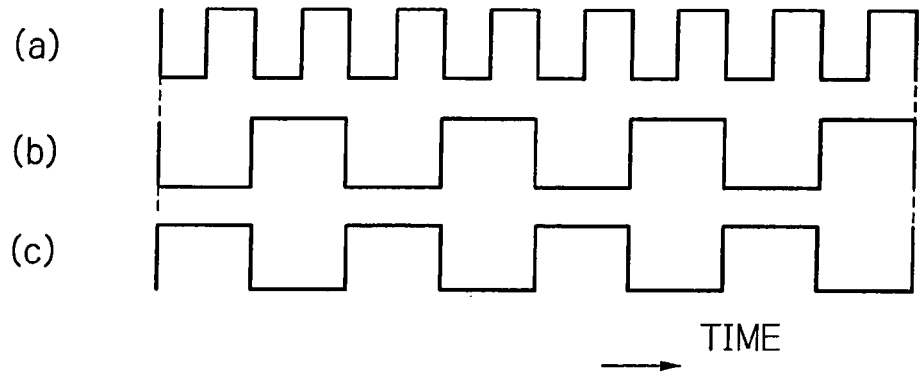
Figure 27A:
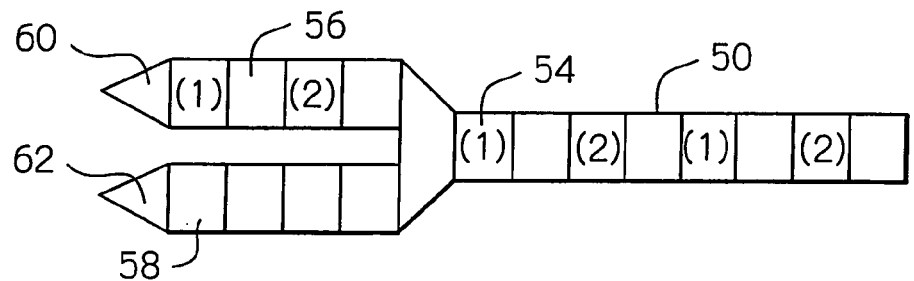
Figure 27B:
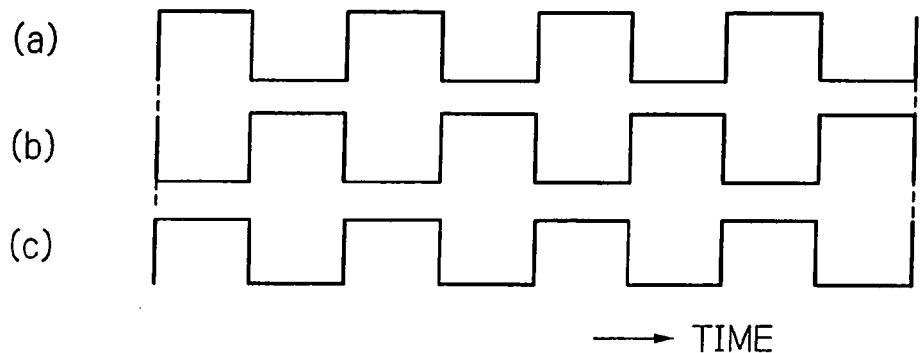

When the device temperature is significantly different from the normal temperature, the assignment ratio is greatly varied from that for the normal temperature, resulting in the strong effect on a vertical stripe and color mixing in an image frame. The drive method is changed to eliminate the adverse effect on the assignment error. A drive method used at the normal temperature is shown in FIGS. 26A and 26B, and a drive method established after modifying the original drive method is shown in FIGS. 27A and 27B. As shown in FIGS. 26A and 27A, packets of signal charges (1) and (2) are transferred over the branching portion 54, horizontal transfer paths 56 and 58 before the respective amplifiers, and the horizontal transfer path 50 before the branching portion 54. At the normal temperature, as shown in FIG. 26B, lines (a), (b) and (c), the horizontal transfer path 50 is driven by a signal having a frequency twice as high as the frequency of a signal for driving the horizontal transfer paths 56 and 58, and thus the packets of signal charges can be assigned to appropriate ones of the two horizontal transfer paths 56 and 58. FIG. 26B, line (a), shows a drive signal applied to the horizontal transfer path 50, and lines (b) and (c) show drive signals applied to the horizontal transfer paths 56 and 58, respectively. The details of the horizontal transfer driving have been already described in conjunction with FIGS. 7A through 7E and 9.

As shown in FIG. 27B, lines (a), (b) and (c), when the device temperature is significantly different from the normal temperature, the horizontal transfer path 50 is driven by a signal having a frequency equal to the frequency of a signal for driving the horizontal transfer paths 56 and 58, and thus the packets of signal charges can be assigned only to the horizontal transfer path 56. FIG. 27B, line (a), shows a drive signal applied to the horizontal transfer path 50, and lines (c) and (d) show drive signals applied to the horizontal transfer paths 56 and 58, respectively. The details of the driving have been already described in conjunction with FIGS. 8A through 8E and 15.

In the case of FIGS. 8A through 8E and 15, the constant voltage is applied to the branching portion 54 to allow signal charges to be assigned only to the horizontal transfer path 56.

However, instead of applying the constant voltage, the same voltages as disclosed by JP patent publication No. 244340/1993 stated earlier may be applied to the branching portion 54, horizontal transfer paths 56 and 58 before the respective amplifiers, and the horizontal transfer path 50 before the branching portion 54. According to the instant alternative embodiment, assigning signal charges to only one of the two horizontal transfer paths allows the possibility of assignment error to be minimized. Further, even if the residual signal charges caused by assignment error are transferred over the other transfer path and output from the amplifier, they would not be mixed with the signal charges of interest.

Referring to FIGS. 27A and 27B, only one of the two horizontal transfer paths is used and thus the frequency of a signal for driving the horizontal transfer path 50 is lowered. However, an alternative method may also be used for driving only one of the two horizontal transfer paths without using a signal having a lower frequency. For example, when the drive signal of a higher frequency shown in FIGS. 26A and 26B is used while the signal charges are transferred into every other transfer elements of the horizontal transfer path 50, as shown in FIG. 20, the signal charges can be transferred only over one horizontal transfer path 56 to be output from the corresponding amplifier. In particular, by increasing or decreasing spacing between the individual packets of signal charges to be transferred, whether only one or both of the two horizontal transfer paths is used can be determined. In this case, a duration for which signal charges in the branching portion 54 are assigned is shorter than the duration shown in FIGS. 27A and 27B. However, since the method for driving transfer paths is identical to the standard drive method, even when the device is designed such that the frequency of a signal for driving the horizontal transfer path cannot partially be changed, it is advantageous to make use of only one of the horizontal paths.

A further alternative embodiment of the invention will now be described. In the present alternative embodiment, when the device temperature changes, a driving frequency is changed accordingly. In particular, when the device temperature becomes lower, the driving frequency is decreased to reduce the possibility of assignment error. In contrast, when the device temperature becomes higher, the driving frequency is increased. At the normal temperature, drive signals shown in FIG. 28, lines (a), (b) and (c), are applied to the horizontal transfer paths 50, 56 and 58, respectively. Those drive signals are the same as shown in FIG. 26B, lines (a), (b) and (c), respectively. When the system controller 28 detects a decrease in the device temperature using the temperature sensor 200, the system controller 28 instructs the timing signal generator 32 to generate drive signals shown in FIG. 24, lines (d), (e) and (f), which have periods equal to two times the periods of the drive signals shown in lines (a), (b) and (c), respectively. The drivers 20 output the corresponding signals to the horizontal transfer paths 50, 56 and 58.

Figure 28:
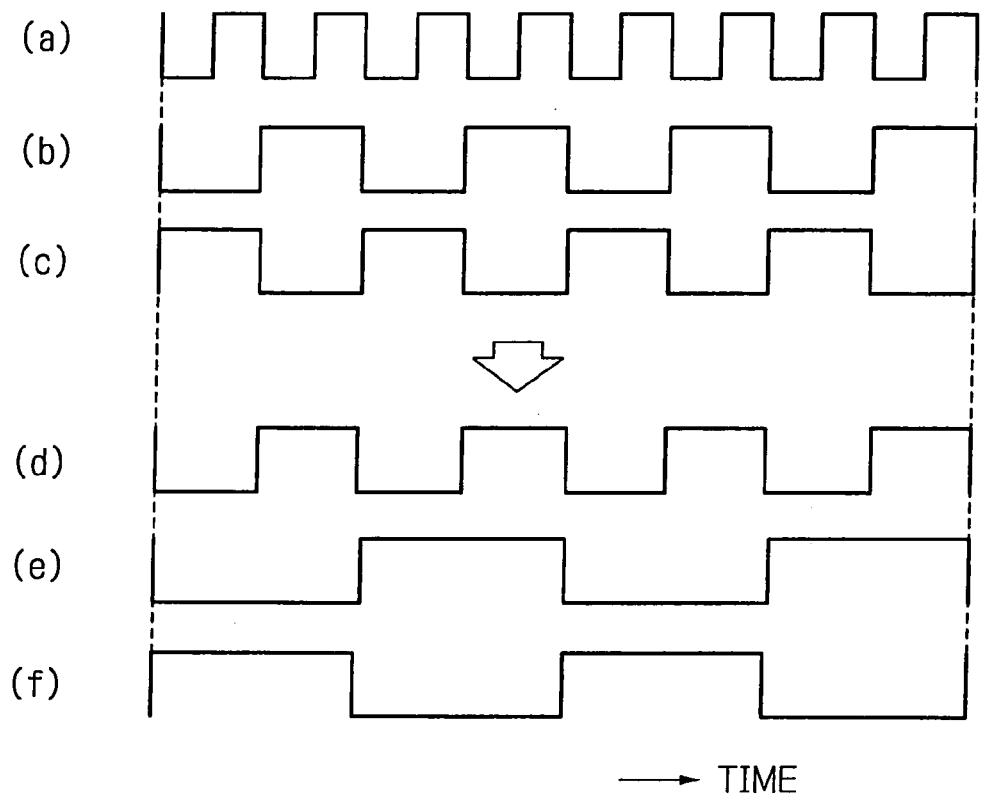
FIG. 28 is a timing chart useful for understanding an exemplified method for changing the frequency of a signal for driving the entire imaging section depending on the device temperature.

In FIG. 28, lines (d), (e) and (f), the periods of the drive signals increase by a factor of two. However, the practice of the invention is not limited to this increase factor of two. Alternatively, the increase factor may be represented by an integer or a value other than an integer. For example, increasing a drive period by a factor of two reduces the possibility of assignment error. This is because the duration for which signal charges are assigned increases by almost a factor of two. When the device temperature is low, the mobility of electric charges due to heat is reduced, thereby increasing the possibility of assignment error. Accordingly, when the device temperature is low, a drive rate is reduced. By contrast, when the device temperature is high, the mobility of electric charges due to heat is increased, thereby reducing the possibility of assignment error. In the latter case, even the driving frequency increased permits the assignment error to be maintained at around the same level as observed at the normal temperature.

Still another alternative embodiment of the invention will now be described. As already described with reference to FIG. 20, an assignment error ratio at high temperature is significantly lower than that at low and normal temperatures. The assignment error ratio is high even at high temperature so far as the amount of signal charges present in the transfer path is small. However, dark current increases at high temperature, and thus, in some cases, when the amount of signal charges present in the transfer path is small, the amount of electric charges caused by dark current becomes larger than that caused by assignment error. In such a case, even when an assignment error is corrected, beneficial effects are small or substantially lost. In this case, in the instant alternative embodiment, the correction is not made taking account of the duration for correction and power consumption to be reduced. In particular, when the system controller 28 detects an increase in the device temperature using the temperature sensor 200, the controller 28 instructs the temperature-induced drift compensator 216 not to make the correction. Incidentally, in contrast to the operations described in connection with the embodiment shown in FIG. 28, it may be contemplated that the method for reducing a driving frequency at high temperature is carried out simultaneously in the embodiment. A process of reducing the driving frequency to reduce the assignment error ratio may be combined with a process of instructing to not correct for assignment error.

A still further alternative embodiment of the invention will now be described. In the foregoing embodiments, the drive method or the assignment ratio required for error correction is changeable in response to a change in temperature. This is based on the idea that a change in temperature of the branching portion causes a significant change in assignment error ratio and thus the drive method and assignment ratio are changeable in dependent upon a change in temperature in order to compensate for an impact on the assignment error ratio. Apart from that idea, if the temperature of the branching portion could be maintained at a constant temperature, different assignment ratios need not be stored in a memory, etc.

Figure 29:
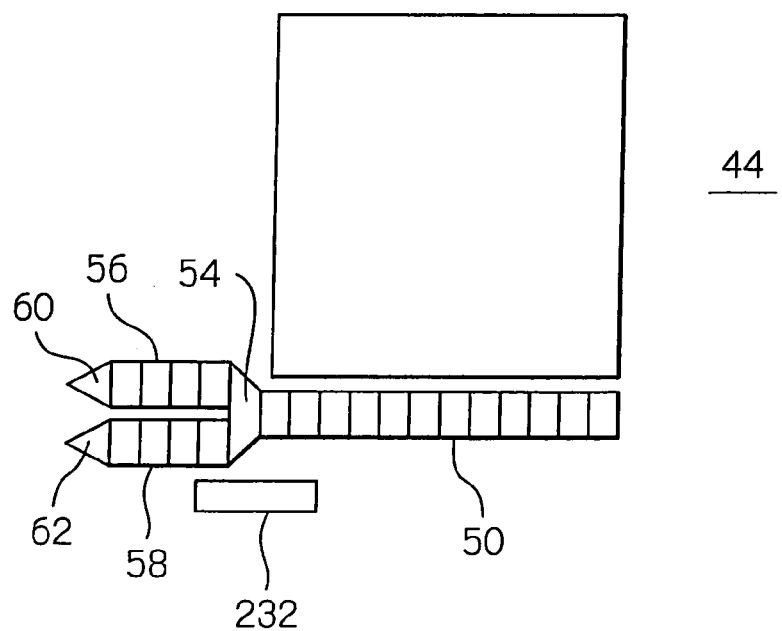
FIG. 29 schematically shows the arrangement of a heater in the image pickup device.
Figure 30:
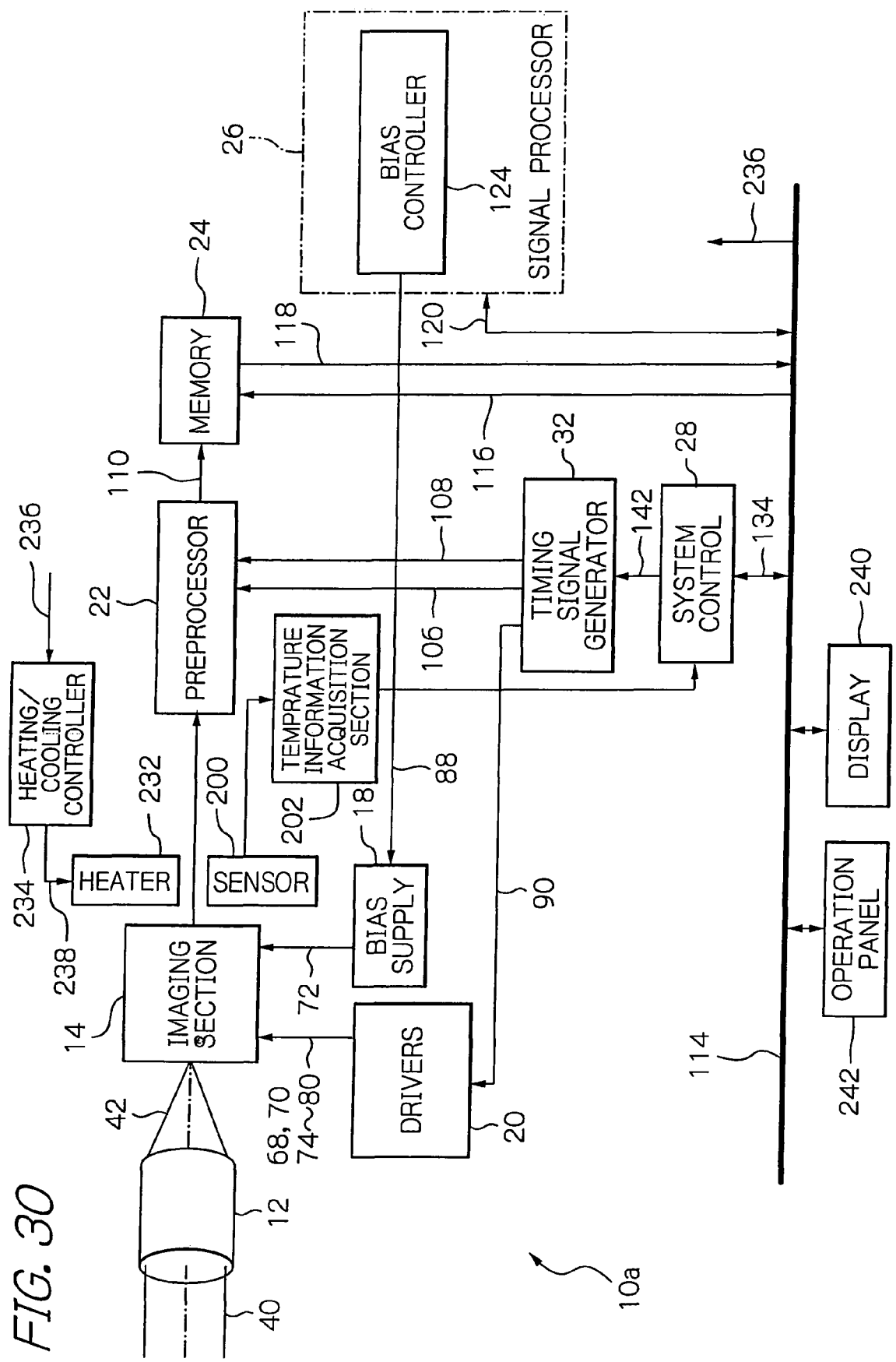
FIG. 30 is a schematic block diagram showing an embodiment of the entire image pickup device including the heater.

Then, the present alternative embodiment shown in FIG. 29 has a heater 232 placed near the branching portion 54 or in a location from which heat is easily transferred to the branching portion 54. FIG. 29 shows the position of the heater 232 on the image pickup device 44. Although the heater 232 only needs to raise the temperature, the assignment error changes more largely at lower temperature, and thus heat emitted from the heater is sufficient to compensate for the assignment error at lower temperature. As shown in FIG. 30, an image pickup apparatus 10a includes a heating/cooling control 234 for control of the heater 232. FIG. 30 is an overall block diagram of the present alternative embodiment of image pickup apparatus 10a using the heater 232. When the heating/cooling control 234 is instructed by the system controller 28 through a control line 236 to start heating, the controller 234 provides electric power to the heater through the control line 236. When the controller 234 is instructed by the system controller 28 through the control line 236 to stop heating, the controller 234 stops providing electric power to the heater. When the system controller 28 detects a decrease in the device temperature using the temperature sensor 200, the controller 28 instructs the heating/cooling control 234 to commence heating. When the system controller 28 detects the device temperature is higher than the normal temperature, the controller 28 instructs the heating/cooling control 234 to stop heating.

The temperature control device is not limited to an electric heater, but may be an electronic heater such as a Peltier device. The Peltier device is very effective and is capable of heating as well as cooling. In contrast, the electric heater may be comprised of only one resistor and thus is advantageous in that there is a much higher degree of freedom available for cost and volume optimization.

In the instant alternative embodiment, when the temperature sensed by the temperature detection means is different from the normal temperature, heating or cooling is carried out to keep the temperature of interest close to the normal temperature. Further, to easily transfer heat to the branching portion, a material of high thermal conductivity may be formed within the region surrounding the branching portion 54.

A still further alternative embodiment of the invention will be described. In the alternative embodiment shown in FIGS. 26A and 26B, heating or cooling is carried out using the heater or Peltier device. However, the method for heating is not limited to the use of such heating elements. When the image pickup device 44 is driven, a large amount of heat is generated particularly in its amplifiers and horizontal transfer paths. The higher the driving frequency, the larger the amount of heat generated. The lower the driving frequency, the smaller the amount of heat generated.

Then, the still further alternative embodiment is adapted such that, when the temperature of the image pickup device 44 sensed by the temperature detection means such as the temperature sensor 200 is low, the driving frequency or drive current is increased to increase the amount of heat generated. It is frequently observed that particularly at the moment when the camera 10a is powered on, the device temperature is relatively low and thus it is desirable to sense the device temperature when the camera is powered on. For example, the device temperature is too low when the camera is brought into a cold site such as a ski slope. Further, when the camera 10a successively captures the image of an object so that the device temperature is increased to a higher temperature, the heat generated in the device 10a can be reduced by reducing driving frequency or current. Whether or not the device temperature is low in the context may be determined with respect to a predetermined temperature threshold, for example, zero degrees centigrade.

It is assumed that at high temperature, when the device temperature is offset from the ambient temperature to a given extent, the driving frequency is reduced, and when an offset of the device temperature from the ambient temperature is negligible, the driving frequency is not reduced. This relies upon the fact that when the ambient temperature is substantially the same as the imaging section 14, reduction of the driving frequency does not lead to reduction in the heat generated in the device 44. The ambient temperature is measured by a temperature sensor mounted on the surface of the camera 10a.

Figure 31:
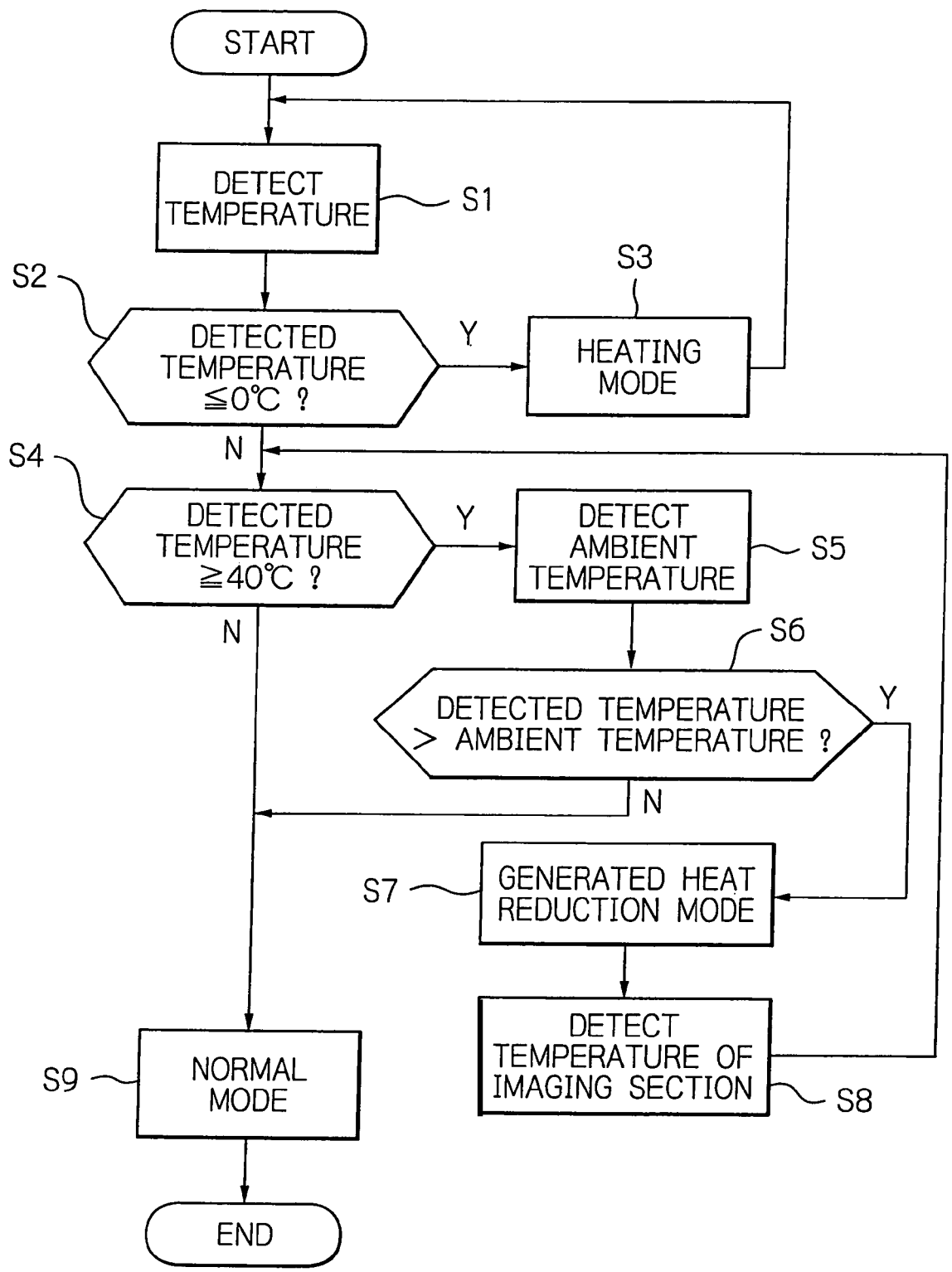
FIG. 31 is an operational flow chart useful for understanding an exemplified method for heating the image pickup device without using the heater.

The operation of the embodiment will be described with reference to FIG. 31, which is a flow chart of the alternative embodiment. When the camera 10a is powered on, the system controller 28 detects the temperature of the imaging section 14 using the temperature sensor 200 (step S1). The system controller 28 determines whether or not the detected temperature is below the predetermined temperature, e.g. zero degrees centigrade (step S2). If it is (Y), the operation proceeds to step S3. In step S3, the system controller 28 instructs the timing control 32 to raise the frequency of the signal for driving the imaging section 14 and to start heating the imaging section 14, which is a heating mode. Thus, the imaging section 14 generates a significant amount of heat. After the instruction has been issued, the operation of the system controller 28 returns to step S1 where the device temperature is again sensed.

If the sensed temperature is above zero degrees centigrade in step S2, the operation of the system controller 28 proceeds to step S4. In step S4, the system controller 28 determines whether or not the sensed temperature is above a predetermined temperature threshold, e.g. 40 degrees centigrade. If it is, the operation proceeds to step S5.

In step S5, the system controller 28 detects the ambient temperature using an ambient temperature measurement sensor. The system controller 28 determines whether or not the temperature of the image pickup device 10a is above the ambient temperature (step S6). If it is, then the operation proceeds to step S7. In step 87, i.e. heat-radiating mode, the system controller 28 instructs the timing control 32 to generate the signal for driving the imaging section 14 with its frequency lower than the regular frequency and to reduce the heat generated in the imaging section 14. Thus, the imaging section 14 generates a smaller amount of heat. After the instruction has been issued, the system controller 28 detects the temperature of the imaging section 14 using the temperature sensor 200 (step S8). Then, the operation returns to step S4.

If the detected temperature is below 40 degrees centigrade in step S4, then the operation of the system controller 28 proceeds to step S9. In step S9, the system controller 28 instructs the timing control 32 to generate the signal for driving the imaging section 14 with the regular frequency. Thus, the imaging section 14 generates a normal amount of heat. According to the alternative embodiment, the range of temperature change of the image pickup apparatus 10a is smaller, and as a result, the accuracy of the error correction formula used to correct the change in amount of signal charges due to assignment error is improved.

In the instant alternative embodiment, when the driving frequency is increased at low temperature at which the assignment error is inherently high, it could be predicted that the assignment error becomes higher because of the increased driving frequency. This would cause an undesirable condition in which image quality is lowered or a user sometimes cannot photograph an object. Then, when the imaging section 14 is heated, it is preferable that means is provided for informing a user of such an undesirable condition. As an example of the means, a monitor display 240, FIGS. 26A and 26B, is utilized. When the imaging section 14 is heated, the monitor display 240 displays indications such as letters, characters or marks, for notifying that the image quality becomes lower.

In contrast, when the driving frequency is reduced to reduce or radiate the heat generated in the imaging section 44, it is predicted that since the drive frequency is reduced at high temperature, an assignment efficiency at the branching portion 54 becomes higher than that observed when the imaging section 44 is driven with the regular frequency at high temperature and the image quality becomes higher. However, if there should occur an abnormal condition in which the display rate of a through image (moving image) becomes lower, it is preferred for the convenience of the user to display information about the abnormal condition on the monitor display 240. If required, a restriction may be applied for preventing the user from photographing on a through image. For example, the device 10a may be designed such that even if the user depresses the shutter release button on the operation panel 242, the system controller 28 makes a determination of preventing the camera 10a from photographing.

A yet further alternative embodiment of the invention will now be described. The temperature information providing means for providing information dependent on temperature according to the foregoing embodiments is embodied by the temperature sensor 200 disposed directly on the image pickup device 44 for sensing the temperature of the device. Instead, the detection means may be adapted to estimate the device temperature based on the level of dark current of the image pickup device, which will now be described.

Figure 32A:
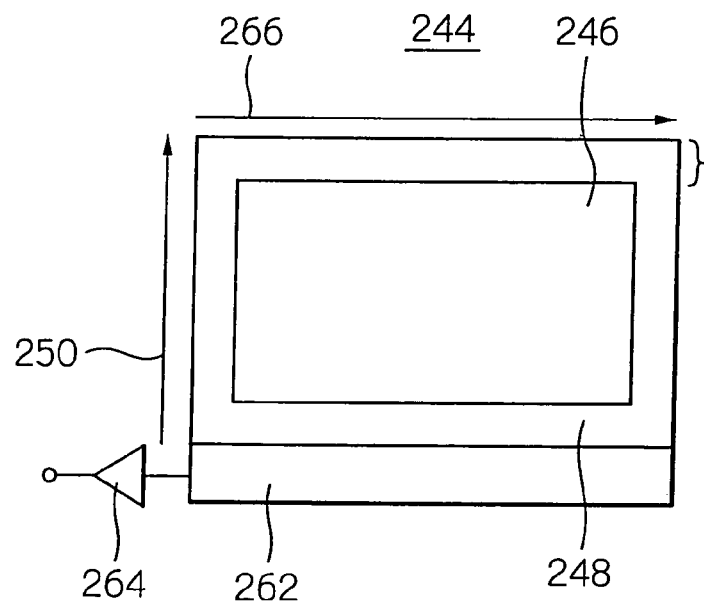
FIGS. 32A and 32B show how the device temperature is obtained based on dark current.

In an image pickup device 244 shown in FIG. 32A, image data of an entire frame of image is read out with incident light blocked, for example, with the mechanical shutter closed, and then the amount of dark current is determined. The imaging surface or photosensitive cell array typically consists of an effective pixel area 246 and an optical black (OB) area 248 surrounding the pixel area 246. The OB area 248 is always shielded from light. Dark current component is read out from a horizontal transfer path 262 via an amplifier 264.

Figure 32B:
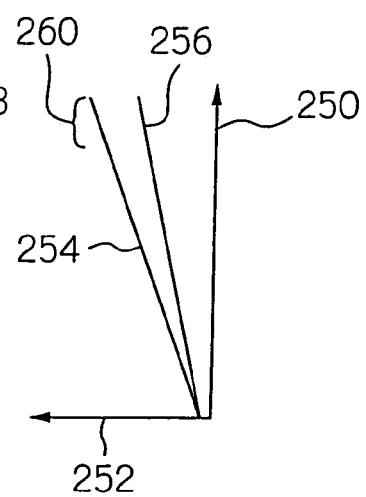

In FIG. 32A, the vertical axis 250 is taken positive vertically upwards, and FIG. 32B plots dark current coming from the pixels arranged in the vertical columns. The abscissa axis 252 in FIG. 32B indicates the level of dark current and the vertical axis 250 indicates a vertical coordinate 250, or position in the imaging surface. The level of dark current 256 at high temperature is larger than the level of dark current 254 at low temperature, and the slope of the curve of dark current is larger at high temperature than at low temperature. The slope allows estimation of the device temperature. Incidentally, the level of dark current is found to be higher toward the top of the imaging frame. That is caused by the duration required to read out dark current charges from the pixels closer to the top of the imaging frame becomes longer so that the level of dark current generated in the vertical transfer path increases. The area of pixels from which dark current is read out may not particularly be restricted in a lateral direction 266, FIG. 32A, but should preferably be elongated in the lateral direction 266.

Further, instead of using all the data derived from the columns optically shielded, using only the data from an upper side portion 258 of the OB area 248 surrounding the effective pixel area 248, for example, allows the level of dark current to be determined. An upper portion 260 of the graph of FIG. 32B corresponds to the upper side portion 258. Data from the pixels contained in the upper side portion 258 are averaged and the resulting average value allows to be used for estimating the device temperature. When only the data from the upper side portion of the OB area 258 is used, light may not be shielded. As described so far, the use of the dark current allows error correction to be carried out if a relationship is determined in advance between the data of the level of dark current and the transfer efficiency correction quantity, even without using a temperature parameter.

The entire disclosure of Japanese patent application No. 2006-238670 filed on Sep. 4, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image pickup apparatus comprising an image pickup device including:
    a plurality of photosensitive cells for converting incident light from a scene to an electric signal charge;
    a first transfer path for transferring the signal charge read out from said plurality of photosensitive cells in a first direction;
    a second transfer path for transferring the signal charge transferred over said first transfer path in a second direction;
    an assignment circuit connected to an output end of said second transfer path for assigning the transferred signal charge to a plurality of output channels;
    a plurality of third transfer paths serving as the plurality of output channels and connected to said assignment circuit; and
    an output circuit connected to output ends of said plurality of third transfer paths,
    said apparatus further comprising:
    a corrector for correcting a transfer error of the signal charge in said image pickup device; and
    a temperature information providing circuit for providing information depending on a temperature of at least part of said image pickup device,
    said corrector being responsive to the provided information to adjust transfer error correction.

2. The apparatus in accordance with claim 1, further comprising an estimation value generator for generating an estimation value of the transfer error based on the information, said corrector using the estimation value generated to perform the correction.

3. An image pickup apparatus comprising an image pickup device including:
    a plurality of photosensitive cells for converting incident light from a scene to an electric signal charge;
    a first transfer path for transferring the signal charge read out from said photosensitive cells in a first direction;
    a second transfer path for transferring the signal charge transferred over said first transfer path in a second direction;
    an assignment circuit connected to an output end of said second transfer path for assigning the transferred signal charge to a plurality of output channels;
    a plurality of third transfer paths serving as the plurality of output channels and connected to said assignment circuit; and
    an output circuit connected to output ends of said plurality of third transfer paths,
    said apparatus further comprising:
    a temperature information providing circuit for providing information depending on a temperature of at least part of said image pickup device,
    a corrector including a transfer controller operative in response to the provided information for increasing or decreasing a number of the third transfer paths used for transfer among said plurality of third transfer paths.

4. The apparatus in accordance with claim 3, wherein said transfer controller changes drive of said second transfer path, said assignment circuit or said plurality of third transfer paths to increase or decrease the number of said third transfer paths used for the transfer.

5. The apparatus in accordance with claim 3, wherein the transfer is made for the signal charge generated in each of said plurality of photosensitive cells,
    said transfer controller changing spacing between packets of signal charge transferred over said second transfer path, said assignment circuit and said plurality of third transfer paths to increase or decrease the number of said third transfer paths used for the transfer.

6. An image pickup apparatus comprising an image pickup device including:
    a plurality of photosensitive cells for converting incident light from a scene to an electric signal charge;

a first transfer path for transferring the signal charge read out from said plurality of photosensitive cells in a first direction;

a second transfer path for transferring the signal charge transferred over said first transfer path in a second direction;

an assignment circuit connected to an output end of said second transfer path for assigning the transferred signal charge to a plurality of output channels;

a plurality of third transfer paths serving as the output channels and connected to said assignment circuit; and an output circuit connected to output ends of said plurality of third transfer paths, said apparatus further comprising:

a corrector for correcting a transfer error of the signal charge in said image pickup device; and a temperature information providing circuit for providing information depending on a temperature of at least part of said image pickup device, said corrector not correcting a transfer error when the provided information is higher than a predetermined temperature threshold.

7. An image pickup apparatus comprising an image pickup device including:

a plurality of photosensitive cells for converting incident light from a scene to an electric signal charge;

a first transfer path for transferring the signal charge read out from said photosensitive cells in a first direction;

a second transfer path for transferring the signal charge transferred over said first transfer path in a second direction;

an assignment circuit connected to an output end of said second transfer path for assigning the transferred signal charge to a plurality of output channels;

a plurality of third transfer paths serving as the plurality of output channels and connected to said assignment circuit; and an output circuit connected to output ends of said third transfer paths, said apparatus further comprising:

a temperature information providing circuit for providing information depending on a temperature of at least part of said image pickup device; and a temperature controller operative in response to the provided information for controlling a temperature of at least part of said image pickup device to reduce a transfer error.

8. A method of correcting a transfer error in an image pickup device including: a plurality of photosensitive cells for converting incident light from a scene to an electric signal charge; a first transfer path for transferring the signal charge read out from the photosensitive cells in a first direction; a second transfer path for transferring the signal charge transferred over the first transfer path in a second direction; an assignment circuit connected to an output end of the second transfer path for assigning the transferred signal charge to a plurality of output channels; a plurality of third transfer paths serving as the output channels and connected to the assignment circuit; and an output circuit connected to output ends of the third transfer paths, said method comprising the steps of:

correcting a transfer error of the signal charge in the image pickup device;

obtaining information depending on a temperature of at least part of the image pickup device; and adjusting transfer error correction based on the obtained information.

* * * * *